(12) United States Patent
Imaoku et al.

(10) Patent No.: US 10,718,966 B2
(45) Date of Patent: Jul. 21, 2020

(54) LIQUID CRYSTAL DISPLAY DEVICE

(71) Applicants: Panasonic Liquid Crystal Display Co., Ltd., Hyogo (JP); Pasona Knowledge Partner Inc., Osaka (JP)

(72) Inventors: Takao Imaoku, Hyogo (JP); Kazuhiko Tsuda, Hyogo (JP); Ikuko Imajo, Hyogo (JP); Yusuke Katagiri, Hyogo (JP)

(73) Assignees: PANASONIC LIQUID CRYSTAL DISPLAY CO., LTD., Hyogo (JP); PASONA KNOWLEDGE PARTNER INC., Osaka (JP)

( * ) Notice: Subject to any disclaimer, the term of this patent is extended or adjusted under 35 U.S.C. 154(b) by 0 days.

(21) Appl. No.: 16/050,843

(22) Filed: Jul. 31, 2018

(65) Prior Publication Data

US 2019/0041684 A1    Feb. 7, 2019

(30) Foreign Application Priority Data

Aug. 2, 2017   (JP) .................................. 2017-149906
Jun. 19, 2018  (JP) .................................. 2018-115757

(51) Int. Cl.
*G02F 1/1333*       (2006.01)
*G02F 1/1335*       (2006.01)
(Continued)

(52) U.S. Cl.
CPC ...... *G02F 1/133308* (2013.01); *G02F 1/1339* (2013.01); *G02F 1/1347* (2013.01);
(Continued)

(58) Field of Classification Search
CPC .............. G02F 1/1347; G02F 2202/28; G02F 1/133528; G02F 1/133308; G02F 2001/133388; G02F 1/133512; G09G 2300/023; B32B 7/14; H04N 13/00; G02B 27/22
See application file for complete search history.

(56) References Cited

U.S. PATENT DOCUMENTS 6,646,697 B1 * 11/2003 Sekiguchi ........... G02F 1/13471
                                                    349/73
8,009,248 B2 *  8/2011 Nakai ................. G02F 1/13471
                                                    349/117

(Continued)

FOREIGN PATENT DOCUMENTS

JP        2011-076107         4/2011

*Primary Examiner* — Michael H Caley
*Assistant Examiner* — Jonathan Y Jung
(74) *Attorney, Agent, or Firm* — Hamre, Schumann, Mueller & Larson, P.C.

(57) ABSTRACT

A liquid crystal display device comprises: a first display panel including a first liquid crystal cell and a pair of first polarizing plates sandwiching the first liquid crystal cell; a second display panel including a second liquid crystal cell and a pair of second polarizing plates sandwiching the second liquid crystal cell; and a bonding member bonding one of the pair of first polarizing plates of the first display panel and one of the pair of second polarizing plates of the second display panel together. An end of the bonding member is located inside an end of the first polarizing plate and an end of the second polarizing plate.

14 Claims, 12 Drawing Sheets

(51) Int. Cl.
  *G02F 1/1339* (2006.01)
  *G02F 1/1347* (2006.01)
  *G02F 1/1368* (2006.01)
  *G02F 1/1345* (2006.01)
  *G09G 3/36* (2006.01)
  *B32B 7/14* (2006.01)
  *H04N 13/00* (2018.01)
  *G02B 30/00* (2020.01)

(52) U.S. Cl.
  CPC ........ *G02F 1/1368* (2013.01); *G02F 1/13452* (2013.01); *G02F 1/133528* (2013.01); *B32B 7/14* (2013.01); *G02B 30/00* (2020.01); *G02F 1/133512* (2013.01); *G02F 2001/13332* (2013.01); *G02F 2001/133314* (2013.01); *G02F 2202/28* (2013.01); *G09G 3/36* (2013.01); *G09G 2300/023* (2013.01); *G09G 2310/08* (2013.01); *H04N 13/00* (2013.01)

(56) References Cited

U.S. PATENT DOCUMENTS

| | | | |
|---|---|---|---|
| 9,035,893 B2* | 5/2015 | Oohira | G02F 1/13338 345/173 |
| 2009/0147186 A1 | 6/2009 | Nakai et al. | |
| 2011/0195240 A1* | 8/2011 | Inenaga | B32B 7/02 428/215 |
| 2013/0164479 A1* | 6/2013 | Lo | B32B 3/06 428/53 |
| 2016/0170702 A1* | 6/2016 | Jiang | G02F 1/1368 345/618 |

* cited by examiner

LIQUID CRYSTAL DISPLAY DEVICE

CROSS-REFERENCE TO RELATED APPLICATION

This application claims priority from Japanese application JP 2017-149906, filed Aug. 2, 2017 and Japanese application JP 2018-115757, filed Jun. 19, 2018. These Japanese applications are incorporated herein by reference.

TECHNICAL FIELD

The present invention relates to a liquid crystal display device.

BACKGROUND

A liquid crystal display device using a display panel including a liquid crystal cell is used as a display of a television, a monitor or the like. However, the liquid crystal display device has a contrast ratio lower than an organic electro luminescence (EL) display device.

A technique, in which two display panels overlap each other and an image is displayed on each display panel, is conventionally proposed as a technique of improving a contrast ratio of a liquid crystal display device (for example, see Unexamined Japanese Patent Publication No. 2011-076107). A color image is displayed on a front-side (observer-side) display panel in two display panels disposed back and forth, and a black-and-white image is displayed on a rear-side (backlight-side) display panel, thereby improving the contrast ratio.

In this case, the two display panels are bonded together by a bonding layer such as an optically clear adhesive (OCA) and an optically clear resin (OCR).

SUMMARY

The display panel of the liquid crystal display device includes a liquid crystal cell and a pair of polarizing plates sandwiching the liquid crystal cell. When two such display panels are bonded by the OCA, the polarizing plates of the two display panels are bonded together by the OCA. At this point, thickness unevenness is generated in the liquid crystal cell, or a bubble invades in an interface between the polarizing plate and the OCA, which results in degradation of quality of a display image.

The present disclosure provides a liquid crystal display device capable of preventing the degradation of the quality of the displayed image even if a plurality of display panels are bonded by the bonding layer such as the OCA.

To solve the above problem, a first liquid crystal display device according to a present disclosure comprises: a first display panel including a first liquid crystal cell and a pair of first polarizing plates sandwiching the first liquid crystal cell; a second display panel including a second liquid crystal cell and a pair of second polarizing plates sandwiching the second liquid crystal cell; and a bonding member bonding one of the pair of first polarizing plates of the first display panel and one of the pair of second polarizing plates of the second display panel together. The bonding member includes a first bonding layer bonded to the first polarizing plate, a second bonding layer bonded to the second polarizing plate, and a third bonding layer located between the first bonding layer and the second bonding layer, and the first bonding layer and the second bonding layer are harder than the third bonding layer.

To solve the above problem, a second liquid crystal display device according to a present disclosure comprises: a first display panel including a first liquid crystal cell and a pair of first polarizing plates sandwiching the first liquid crystal cell; a second display panel including a second liquid crystal cell and a pair of second polarizing plates sandwiching the second liquid crystal cell; and a bonding member bonding one of the pair of first polarizing plates of the first display panel and one of the pair of second polarizing plates of the second display panel together. The bonding member includes a first bonding layer bonded to the first polarizing plate, a second bonding layer bonded to the second polarizing plate, and a third bonding layer located between the first bonding layer and the second bonding layer, and an end of the first bonding layer, an end of the third bonding layer, and an end of the second bonding layer are offset from one another at an end of the bonding member.

To solve the above problem, a third liquid crystal display device according to a present disclosure comprises: a first display panel including a first liquid crystal cell and a pair of first polarizing plates sandwiching the first liquid crystal cell; a second display panel including a second liquid crystal cell and a pair of second polarizing plates sandwiching the second liquid crystal cell; and a bonding member bonding one of the pair of first polarizing plates of the first display panel and one of the pair of second polarizing plates of the second display panel together. The bonding member includes a first bonding layer bonded to the first polarizing plate, a second bonding layer bonded to the second polarizing plate, and an intermediate layer located between the first bonding layer and the second bonding layer, and the intermediate layer is harder than the first bonding layer and the second bonding layer.

To solve the above problem, a fourth liquid crystal display device according to a present disclosure comprises: a first display panel including a first liquid crystal cell and a pair of first polarizing plates sandwiching the first liquid crystal cell; a second display panel including a second liquid crystal cell and a pair of second polarizing plates sandwiching the second liquid crystal cell; and a bonding member bonding one of the pair of first polarizing plates of the first display panel and one of the pair of second polarizing plates of the second display panel together. An end of the bonding member is located inside an end of the first polarizing plate and an end of the second polarizing plate at ends of the first display panel and the second display panel.

DETAILED DESCRIPTION

The following describes an exemplary embodiment of the present disclosure. The embodiment described below is merely one specific example of the present disclosure. The numerical values, shapes, materials, elements, and arrangement and connection of the elements, etc. indicated in the following embodiment are given merely by way of illustration and are not intended to limit the present disclosure. Therefore, among elements in the following embodiment, those not recited in any one of the independent claims defining the broadest inventive concept of the present disclosure are described as optional elements.

Note that the figures are schematic illustrations and are not necessarily precise depictions. Accordingly, the figures are not necessarily to scale. Moreover, in the figures, elements that are essentially the same share like reference signs. Accordingly, duplicate description is omitted or simplified.

First Exemplary Embodiment

Figure 1:
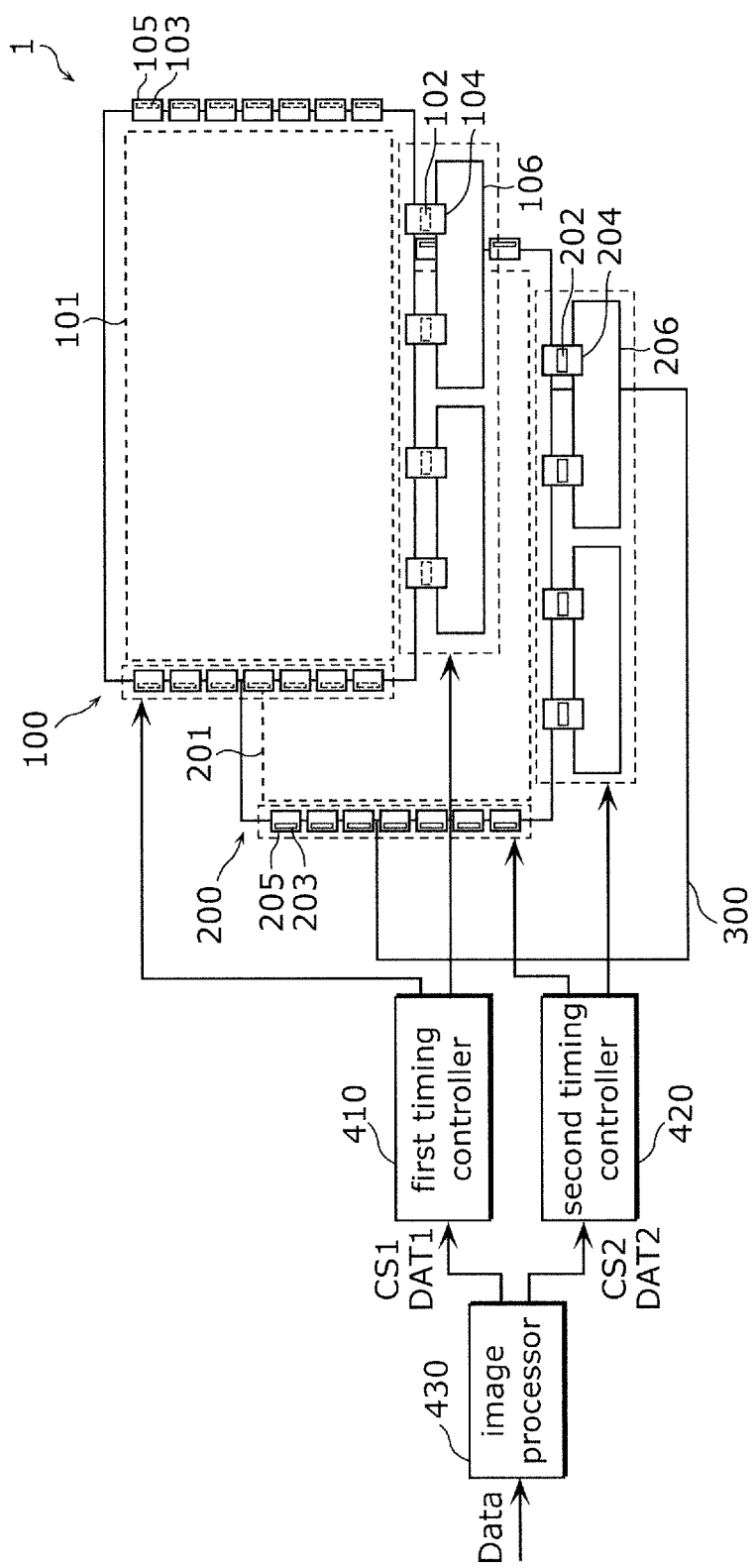
FIG. 1 is a view illustrating a schematic configuration of a liquid display device according to a first exemplary embodiment.

FIG. 1 is a view illustrating a schematic configuration of a display device according to an exemplary embodiment.

Liquid crystal display device 1 is an example of an image display device configured by superimposing a plurality of display panels each including liquid crystal cells, and displays an image (video) of a still image or a moving image.

As illustrated in FIG. 1, liquid crystal display device 1 of the first exemplary embodiment includes first display panel 100 disposed at a position (front side) close to an observer and second display panel 200 disposed at a position (rear side) farther away from the observer than first display panel 100.

Further, liquid crystal display device 1 includes backlight 300 disposed on the rear side of first display panel 100 and second display panel 200. Specifically, backlight 300 is disposed on the rear side of second display panel 200.

First display panel 100 is a main panel that displays an image visually recognized by a user. In the first exemplary embodiment, first display panel 100 displays a color image. First source driver 102 and first gate driver 103 are provided in first display panel 100 in order to display the color image corresponding to an input video signal on first image display region 101 (active region).

Specifically, first source flexible printed circuit (FPC) 104 on which first source driver 102 is mounted and first gate FPC 105 on which first gate driver 103 is mounted are connected to the liquid crystal cell of first display panel 100.

First source FPC 104 and first gate FPC 105 are connected to electrode terminals of various signal lines of the liquid crystal cell in first display panel 100 by thermocompression bonding using, for example, an anisotropic conductive film (ACF).

First circuit board 106 is connected to a portion of first source FPC 104, the portion being one on an opposite side to first display panel 100. First circuit board 106 is a printed circuit board (PCB) having a substantially rectangular plate shape, and a plurality of electronic components are mounted on first circuit board 106. First circuit board 106 has a function of transmitting various signals output from first timing controller 410 to first source driver 102 mounted on first source FPC 104.

When the color image is displayed in first image display region 101 of first display panel 100, various signals output from first timing controller 410 are input to first source driver 102 and first gate driver 103.

Second display panel 200 is a sub-panel disposed on a back side of first display panel 100. In the first exemplary embodiment, second display panel 200 displays a monochrome image (black-and-white image) of an image corresponding to the color image displayed on first display panel 100 in synchronization with the color image. Second source driver 202 and second gate driver 203 are provided on second display panel 200 in order to display a monochrome image corresponding to the input video signal on second image display region 201.

Specifically, second source FPC 204 on which second source driver 202 is mounted and second gate FPC 205 on which second gate driver 203 is mounted are connected to the liquid crystal cell of second display panel 200. Second source FPC 204 and second gate FPC 205 are connected to electrode terminals of various signal lines of the liquid crystal cell in second display panel 200 by thermocompression bonding using, for example, the ACF.

Second circuit board 206 is connected to a portion of second source FPC 204, the portion being on the opposite side to second display panel 200. Second circuit board 206 is the PCB having the substantially rectangular plate shape, and a plurality of electronic components are mounted on second circuit board 206. Second circuit board 206 has a function of transmitting various signals output from second timing controller 420 to second source driver 202 mounted on second source FPC 204.

When the monochrome image is displayed in second image display region 201 of second display panel 200, various signals output from second timing controller 420 are input to second source driver 202 and second gate driver 203.

First image display region 101 and second image display region 201 include a plurality of pixels arranged in a matrix form. A number of pixels in first image display region 101 and a number of pixels in second image display region 201 may be identical to or different from each other, but the number of pixels in first image display region 101 in first display panel 100 is preferably larger than the number of pixels of second image display region 201 in second display panel 200 which is of a sub-panel.

For example, driving systems of first display panel 100 and second display panel 200 are a lateral electric field system such as an in-plane switching (IPS) system or a fringe field switching (FFS) system. However, the driving system is not limited to the lateral electric field system, but may be a vertical alignment (VA) system or a twisted nematic (TN) system.

Backlight 300 is a light source unit disposed on a back side of first display panel 100 and second display panel 200, and emits light toward first display panel 100 and second display panel 200. In the first exemplary embodiment, backlight 300 is a surface light source unit that uniformly emits diffused light (scattered light) having a planar shape.

For example, backlight 300 is a light emitting diode (LED) backlight in which an LED is used as a light source. However, backlight 300 is not limited to the LED backlight. In the first exemplary embodiment, backlight 300 is a direct-under type backlight, and the plurality of LEDs are two-dimensionally arranged. For example, the plurality of LEDs are arranged in a matrix form along a horizontal line (row direction) and a vertical line (column direction) of pixels. Backlight 300 may include an optical member such as a diffusion plate (diffusion sheet) for diffusing the light from the light source and a prism sheet for controlling light distribution. Backlight 300 is not limited to the direct type, but may be an edge type.

Liquid display device 1 also includes first timing controller 410 that controls first source driver 102 and first gate driver 103 of first display panel 100, second timing controller 420 that controls second source driver 202 and second gate driver 203 of second display panel 200, and image processor 430 that outputs image data to first timing controller 410 and second timing controller 420.

Image processor 430 receives input video signal Data transmitted from an external system (not illustrated), performs image processing on input video signal Data, outputs first image data DAT1 to first timing controller 410, and outputs second image data DAT2 to second timing controller 420. Image processor 430 also outputs a control signal (not illustrated in FIG. 1) such as a synchronizing signal to first timing controller 410 and second timing controller 420. First image data DAT1 is image data used to display the color image, and second image data DAT2 is image data used to display the monochrome image.

In liquid crystal display device 1 of the first exemplary embodiment, the image is displayed while two display panels of first display panel 100 and second display panel 200 are superimposed on each other, so that black can be tightened. Consequently, the image having high contrast ratio can be displayed.

For example, liquid crystal display device 1 is a high dynamic range (HDR) compatible television. In liquid crystal display device 1, a color image having high contrast ratio and high image quality can be displayed using a backlight capable of performing local dimming control as backlight 300.

First display panel 100 and second display panel 200 are bonded to each other, and are held together with backlight 300 by a holding member (a frame or a chassis) made of metal or resin.

Figure 2:
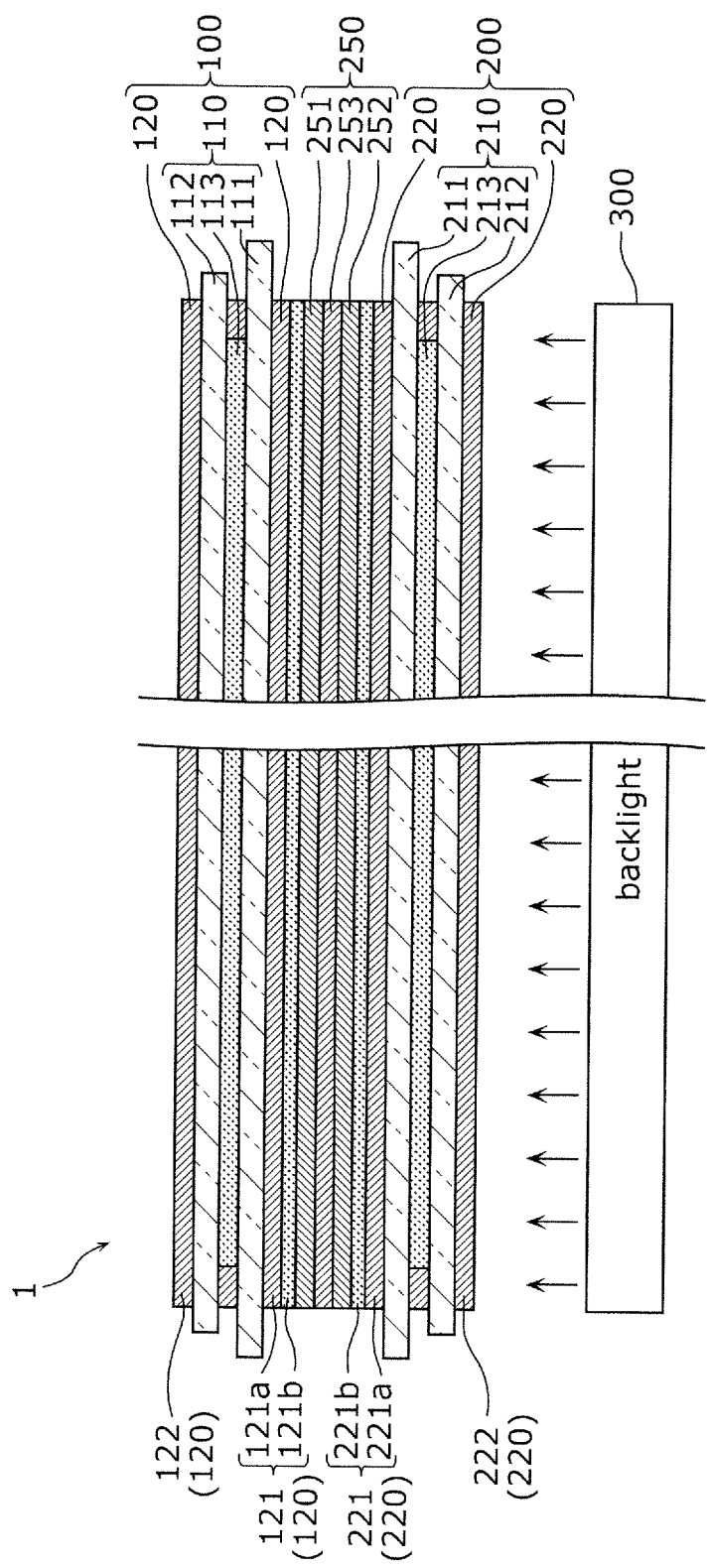
FIG. 2 is a sectional view illustrating a configuration of the liquid crystal display device of the first exemplary embodiment.

A bonding structure of first display panel 100 and second display panel 200 will be described below with reference to FIG. 2. FIG. 2 is a sectional view illustrating a configuration of liquid crystal display device 1 of the first exemplary embodiment.

As illustrated in FIG. 2, liquid crystal display device 1 includes first display panel 100, second display panel 200, and bonding member 250 bonding first display panel 100 and second display panel 200 together.

First display panel 100 includes first liquid crystal cell 110 and a pair of first polarizing plates 120 sandwiching first liquid crystal cell 110.

First liquid crystal cell 110 includes first thin film transistor (TFT) substrate 111, first counter substrate 112 opposed to first TFT substrate 111, and first liquid crystal layer 113 disposed between first TFT substrate 111 and first counter substrate 112. In the first exemplary embodiment, first liquid crystal cell 110 is disposed such that first counter substrate 112 is located in front of first TFT substrate 111.

First TFT substrate 111 is a substrate in which a TFT layer (not illustrated) is formed on a transparent substrate such as a glass substrate. A TFT provided corresponding to each of the pixels arranged in a matrix form and wiring used to drive the TFT are formed in the TFT layer. A pixel electrode used to apply voltage to first liquid crystal layer 113 is formed on a planarization layer of the TFT layer.

First counter substrate 112 is a color filter (CF) substrate in which a color filter layer as a pixel formation layer is formed on a transparent substrate such as a glass substrate. The pixel formation layer of first counter substrate 112 includes a black matrix (black portion) and a color filter (colored portion). The black matrix is formed into, for example, a lattice shape or a stripe shape, and a plurality of matrix-shaped openings constituting pixels are formed in the black matrix. A color filter is formed in each opening of the black matrix. That is, the black matrix surrounds the color filter. For example, each color filter is a red color filter, a green color filter, or a blue color filter. The color filters of such colors correspond to respective pixels. An overcoat layer is formed so as to cover the pixel formation layer. An alignment film is formed on the surface of the overcoat layer.

First liquid crystal layer 113 is sealed between first TFT substrate 111 and first counter substrate 112. For example, first liquid crystal layer 113 is sealed by forming a sealing member into a frame shape along outer peripheral ends of first TFT substrate 111 and first counter substrate 112. The liquid crystal material of first liquid crystal layer 113 can be appropriately selected according to the driving system.

The pair of first polarizing plates 120 sandwiching first liquid crystal cell 110 includes bonding-side first polarizing plate 121 attached to the surface of first liquid crystal cell 110 on the side of bonding member 250 (the side of second liquid crystal cell 210) and non-bonding-side first polarizing plate 122 bonded to the surface of first liquid crystal cell 110 on the opposite side to bonding member 250.

Specifically, bonding-side first polarizing plate 121 is bonded to the surface of first TFT substrate 111 of first liquid crystal cell 110, and bonded to bonding member 250. On the other hand, non-bonding-side first polarizing plate 122 is attached to the surface of first counter substrate 112 of first liquid crystal cell 110.

The pair of first polarizing plates 120 (bonding-side first polarizing plate 121 and non-bonding-side first polarizing plate 122) are disposed such that polarization directions of first polarizing plates 120 are orthogonal to each other. That is, the pair of first polarizing plates 120 is disposed in a crossed-Nicol state.

The pair of first polarizing plates 120 is a sheet-shaped polarizing film made of, for example, a resin material. In the first exemplary embodiment, bonding-side first polarizing plate 121, which is bonded to bonding member 250 in the pair of first polarizing plates 120, includes polarizer 121a and light diffusion adhesive layer 121b disposed on the side of bonding member 250 with respect to polarizer 121a. Each of polarizer 121a and light diffusion adhesive layer 121b is supported by a transparent resin film such as a triacetylcellulose (TAC) film. On the other hand, non-bonding-side first polarizing plate 122, which is not bonded to bonding member 250 in the pair of first polarizing plates 120, includes the polarizer and the TAC film similarly to bonding-side first polarizing plate 121, but does not include the light diffusion adhesive layer.

Each of the pair of first polarizing plates 120 may include a transparent protective film as an outermost layer. One of the pair of first polarizing plates 120 may include a phase-difference plate (phase-difference film).

Second display panel 200 includes second liquid crystal cell 210 and a pair of second polarizing plates 220 sandwiching second liquid crystal cell 210.

Second liquid crystal cell 210 includes second TFT substrate 211, second counter substrate 212 opposed to second TFT substrate 211, and second liquid crystal layer 213 disposed between second TFT substrate 211 and second counter substrate 212. In the first exemplary embodiment, second liquid crystal cell 210 is disposed such that second TFT substrate 211 is located in front of second counter substrate 212. Alternatively, second counter substrate 212 may be disposed in front of second TFT substrate 211.

Second TFT substrate 211 has the same configuration as first TFT substrate 111, and is a substrate in which a TFT layer (not illustrated) is formed on a transparent substrate such as a glass substrate.

Second counter substrate 212 is a substrate in which a pixel formation layer is formed on a transparent substrate such as a glass substrate. The pixel formation layer of second counter substrate 212 includes a black matrix in which a plurality of openings in a matrix form constituting pixels are formed. An overcoat layer is formed so as to cover the pixel formation layer of second counter substrate 212. An alignment film is formed on the surface of the overcoat layer. In the first exemplary embodiment, since second display panel 200 displays a monochrome image, so that the color filter is not formed in the pixel formation layer of second counter substrate 212. Thus, the overcoat layer is filled in the opening of the black matrix of the pixel formation layer of second counter substrate 212.

Second liquid crystal layer 213 is sealed between second TFT substrate 211 and second counter substrate 212. For example, second liquid crystal layer 213 is sealed by forming the sealing member into the frame shape along outer peripheral ends of second TFT substrate 211 and second counter substrate 212. The liquid crystal material of second liquid crystal layer 213 can be appropriately selected according to the driving system.

The pair of second polarizing plates 220 sandwiching second liquid crystal cell 210 has the configuration similar to that of first polarizing plate 120. The pair of second polarizing plates 220 includes bonding-side second polarizing plate 221 bonded to the surface of second liquid crystal cell 210 on the side of bonding member 250 (the side of first liquid crystal cell 110) and non-bonding-side second polarizing plate 222 bonded to the surface of second liquid crystal cell 210 on the opposite side to bonding member 250.

Specifically, bonding-side second polarizing plate 221 is bonded to the surface of second counter substrate 212 of second liquid crystal cell 210, and is bonded to bonding member 250. On the other hand, non-bonding-side second polarizing plate 222 is bonded to the surface of second TFT substrate 211 of second liquid crystal cell 210.

The pair of second polarizing plates 220 (bonding-side second polarizing plate 221 and non-bonding-side second polarizing plate 222) is disposed such that the polarization directions of second polarizing plates 220 are orthogonal to each other. That is, the pair of second polarizing plates 220 is disposed in the crossed-Nicol state.

Each of the pair of second polarizing plates 220 is a sheet-shaped polarizing film made of, for example, a resin material. In the first exemplary embodiment, bonding-side second polarizing plate 221, which is bonded to bonding member 250 in the pair of second polarizing plates 220, includes polarizer 221a and light diffusion adhesive layer 221b disposed on the side of bonding member 250 with respect to polarizer 221a. Each of polarizer 221a and light diffusion adhesive layer 221b is supported by a transparent resin film such as a TAC film. On the other hand, non-bonding-side second polarizing plate 222, which is not bonded to bonding member 250 in the pair of second polarizing plates 220, includes the polarizer and the TAC similarly to bonding-side second polarizing plate 221, but does not include the light diffusion adhesive layer.

Each of the pair of second polarizing plates 220 may include a transparent protective film as an outermost layer. One of the pair of second polarizing plates 220 may include a phase-difference plate (phase-difference film).

Bonding member 250 bonds first display panel 100 and second display panel 200 together. Specifically, bonding member 250 bonds bonding-side first polarizing plate 121 of first display panel 100 and non-bonding-side second polarizing plate 221 of second display panel 200 together. In the first exemplary embodiment, bonding member 250 is in contact with light diffusion adhesive layer 121b of bonding-side first polarizing plate 121, and is in contact with light diffusion adhesive layer 221b of bonding-side second polarizing plate 221.

Bonding member 250 includes first bonding layer 251 bonded to first polarizing plate 120, second bonding layer 252 bonded to second polarizing plate 220, and third bonding layer 253 located between first bonding layer 251 and second bonding layer 252. Specifically, first bonding layer 251 that is an outermost layer of bonding member 250 is bonded to bonding-side first polarizing plate 121 in the pair of first polarizing plates 120. Second bonding layer 252 that is the outermost layer of bonding member 250 is bonded to bonding-side second polarizing plate 221 in the pair of second polarizing plates 220.

In the first exemplary embodiment, bonding member 250 has a three-layer structure of first bonding layer 251, second bonding layer 252, and third bonding layer 253. Thus, third bonding layer 253 is an intermediate layer sandwiched between first bonding layer 251 and second bonding layer 252, which are the outermost layers.

Each of first bonding layer 251, second bonding layer 252, and third bonding layer 253 is a bonding sheet constructed with a film-shaped optically clear adhesive (OCA) sheet, and is made of, for example, an acrylic resin material. That is, bonding member 250 is an adhesive layer for bonding first display panel 100 and second display panel 200 together.

In bonding member 250 configured as described above, first bonding layer 251 and second bonding layer 252 is harder than third bonding layer 253. In other words, third bonding layer 253 of the intermediate layer is softer than first bonding layer 251 and second bonding layer 252 of the outermost layer. In this case, for example, harder first bonding layer 251 and second bonding layer 252 have an average molecular weight of 200,000 to 1,000,000, inclusive, and softer third bonding layer 253 has an average molecular weight of 150,000 to 600,000, inclusive.

The hardness of each bonding layer (first bonding layer 251, second bonding layer 252, and third bonding layer 253) of bonding member 250 is related to a storage modulus of each bonding layer. Specifically, the hardness decreases with decreasing storage modulus, and the hardness increase with increasing storage modulus. In the first exemplary embodiment, for example, harder first bonding layer 251 and second bonding layer 252 have a storage modulus of 0.1 MPa to 0.5 MPa, inclusive at 23° C., and softer bonding third bonding layer 253 has a storage modulus 0.06 MPa to 0.1 MPa at 23° C., inclusive. For example, the storage modulus of each bonding layer of bonding member 250 can be measured by a torsional shearing method using a viscoelasticity measuring device.

In the first exemplary embodiment, first bonding layer 251, second bonding layer 252, and third bonding layer 253 have the same film thickness. For example, first bonding layer 251, second bonding layer 252, and third bonding layer 253 have the same thickness, and a total film thickness (total thickness) of bonding member 250 is greater than or equal to 300 μm.

Effects of liquid crystal display device 1 of the first exemplary embodiment will be described below including circumstances leading to the technique of the present disclosure.

In the case that two display panels including the liquid crystal cell and the pair of polarizing plates sandwiching the liquid crystal cell are bonded together by the OCA, the polarizing plates of the two display panels are bonded together by OCA.

Figure 3:
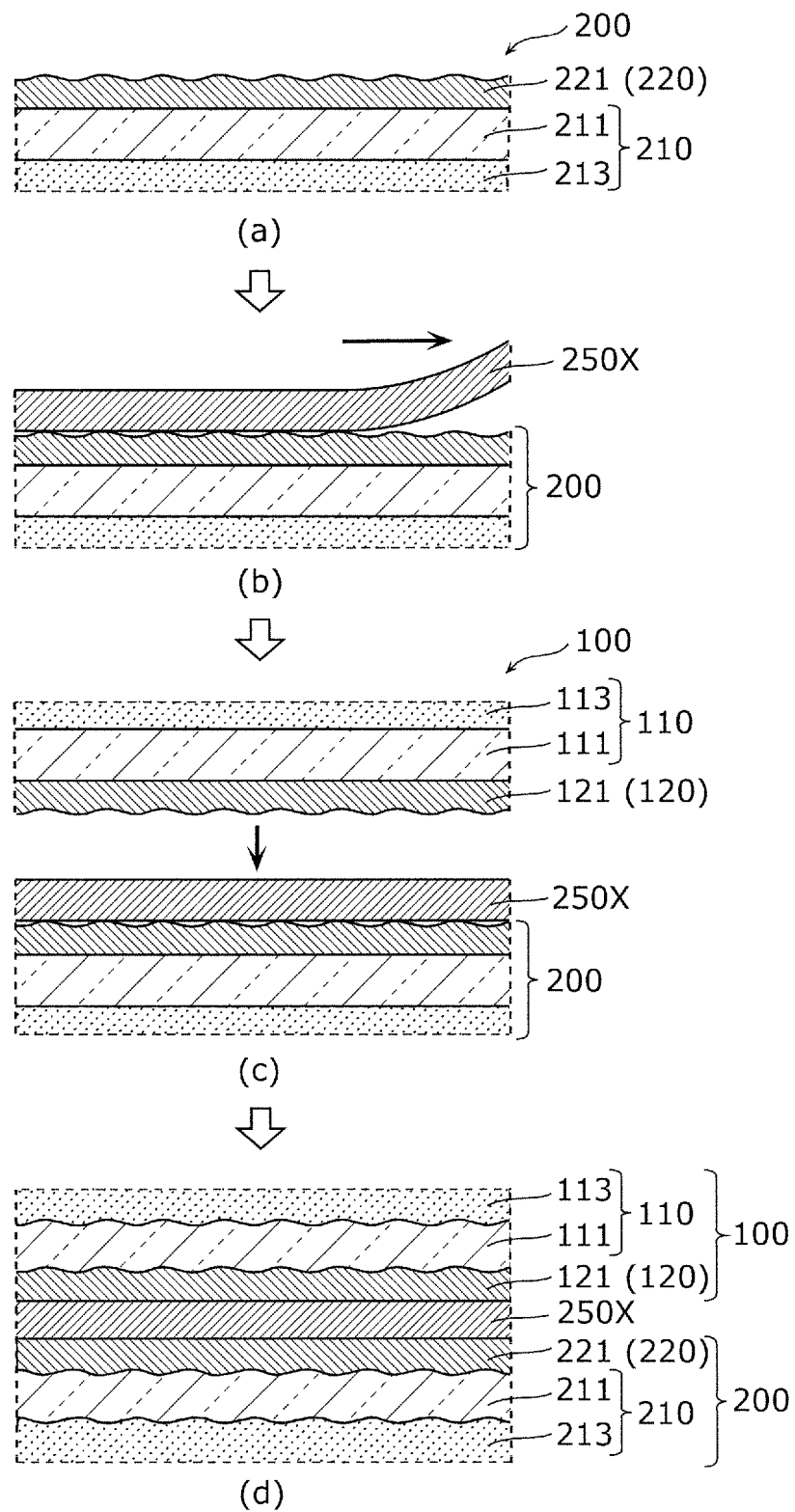
FIG. 3 is a view illustrating a state in which two display panels are bonded together by one thin bonding member.

For example, in the case that first display panel 100 and second display panel 200 are bonded together by bonding member 250X as illustrated in FIG. 3, second display panel 200 is prepared as illustrated in part (a) of FIG. 3, bonding member 250X constructed with one OCA is bonded onto second display panel 200 as illustrated in part (b) of FIG. 3, and first display panel 100 is bonded from above bonding member 250X as illustrated in part (c) of FIG. 3.

At this point, minute irregularities exist on the surfaces of first polarizing plate 120 of first display panel 100 and second polarizing plate 220 of second display panel 200. The minute irregularities are generated during a process of manufacturing the polarizing plate, or generated by a surface treatment such as an anti-glare treatment.

At this time, when bonding member 250X is thin, bonding member 250X does not have flexibility, and bonding member 250X is relatively hard.

For this reason, as illustrated in part (d) of FIG. 3, when first display panel 100 and second display panel 200 are pressed against each other with bonding member 250X interposed therebetween to bond first display panel 100 and second display panel 200 together by bonding member 250X, harder bonding member 250X can hardly absorb the minute irregularities of first polarizing plate 120 and second polarizing plate 220.

As a result, the minute irregularities of first polarizing plate 120 distorts first TFT substrate 111 (glass substrate) of first liquid crystal cell 110. The minute irregularities of second polarizing plate 220 distorts second counter substrate 212 (glass substrate) of second liquid crystal cell 210. As a result, the thickness unevenness is generated in first liquid crystal cell 110 and second liquid crystal cell 210, and quality of the display image is degraded.

It is conceivable to use the thick bonding member. However, the OCA that is commercially available as the bonding member generally has a maximum thickness limit, and there are few options for the OCA from the viewpoint of thickness.

Figure 4:
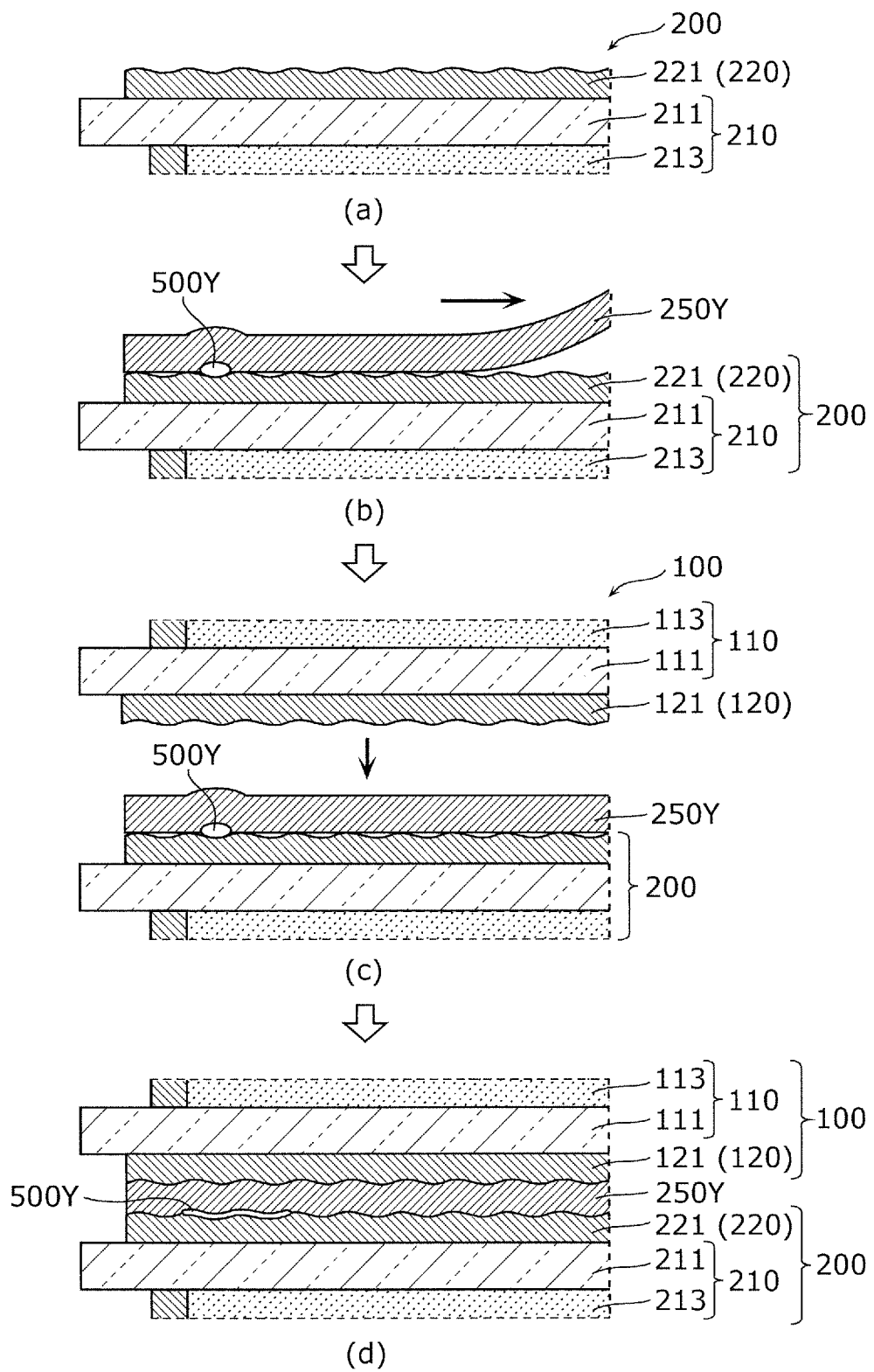
FIG. 4 is a view illustrating a state in which two display panels are bonded together by one soft bonding member.

On the other hand, when the soft OCA is used as bonding member 250Y, in bonding bonding member 250Y onto second display panel 200 as illustrated in parts (a) and (b) of FIG. 4, bubble 500Y invades easily into an interface between second polarizing plate 220 and bonding member 250Y from the end of second display panel 200 that is a bonding starting point of bonding member 250Y. Ends of first display panel 100 and second display panel 200 are illustrated in FIG. 4.

Then, as illustrated in part (c) of FIG. 4, first display panel 100 is bonded from above bonding member 250Y. Although not illustrated, sometimes the bubble invades into the interface between first polarizing plate 120 and bonding member 250Y from the end of first display panel 100.

In this way, when the soft OCA is used as bonding member 250Y for bonding first display panel 100 and second display panel 200, bubble 500Y invades into the interface between first display panel 100 or second display panel 200 and bonding member 250Y, and bubble biting tends to be generated. For example, bubble 500Y has a size of about ϕ1 mm to about ϕ2 mm.

Then, as illustrated in part (d) of FIG. 4, first display panel 100 and second display panel 200 are pressed against each other and bonded together by bonding member 250Y. At this point, if bubble 500Y is present in the image display region (active region), the quality of the display image is degraded.

Even if bubble 500Y is present outside the image display region, as illustrated in part (d) of FIG. 4, bubble 500Y advances inward by application of heat, and invades into the image display region. In the case that bubble 500Y is present in the image display region, bubble 500Y further advances to a side of a central portion of the image display region by the application of the heat, and becomes conspicuous. This further degrades the quality of the display image.

The technique of the present disclosure has been made based on the above knowledge. As a result of intensive research by the inventors of the present application, the inventors have found that, by employing the laminated structure of bonding layers having different material properties for bonding member 250 that bonds first display panel 100 and second display panel 200 together and adjusting the hardness of each bonding layer, the degradation of the quality of the display image due to the thickness unevenness of the liquid crystal cell and the bubble biting can be prevented.

Specifically, in liquid crystal display device 1 of the first exemplary embodiment, as illustrated in FIG. 2, bonding member 250 bonding first display panel 100 and second display panel 200 together is formed by the three-layer structure of first bonding layer 251 bonded to first polarizing plate 120 of first display panel 100, second bonding layer 252 bonded to second polarizing plate 220 of second display panel 200, and third bonding layer 253 located between first bonding layer 251 and second bonding layer 252, and first bonding layer 251 and second bonding layer 252 are harder than third bonding layer 253.

Consequently, even if the minute irregularities are present on the surfaces of first polarizing plate 120 of first display panel 100 and second polarizing plate 220 of second display panel 200, the generation of the thickness unevenness can be prevented in first liquid crystal cell 110 and second liquid crystal cell 210. The bubble can also be prevented from invading between first display panel 100 or second display panel 200 and bonding member 250.

Figure 5:
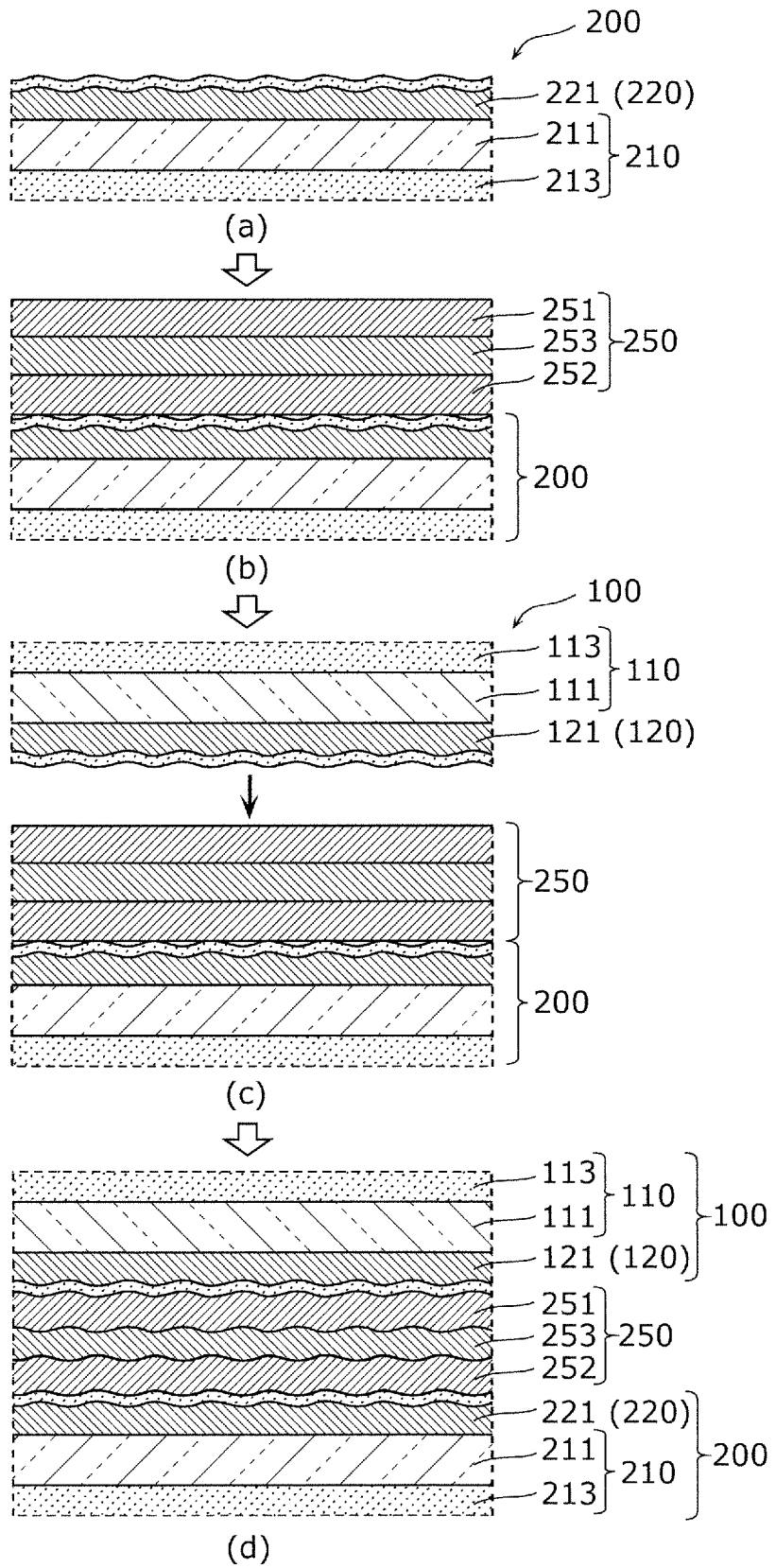
FIG. 5 is a view illustrating a state in which a first display panel and a second display panel are bonded together by a bonding member in the liquid crystal display device of the first exemplary embodiment.

This point will be described in detail below with reference to FIG. 5. FIG. 5 is a view illustrating a state in which first display panel 100 and second display panel 200 are bonded together by bonding member 250 in liquid crystal display device 1 of the first exemplary embodiment. FIG. 5 is an enlarged sectional view illustrating a bonding portion of first display panel 100 and second display panel 200 in liquid crystal display device 1.

In the case that first display panel 100 and second display panel 200 are bonded together by bonding member 250, second display panel 200 is first prepared as illustrated in part (a) of FIG. 5.

Then, as illustrated in part (b) of FIG. 5, bonding member 250 is bonded onto second display panel 200. At this point, second bonding layer 252, third bonding layer 253, and first bonding layer 251 are bonded one by one on second display panel 200 in this order. Specifically, second bonding layer 252 is bonded onto second polarizing plate 220 (bonding-side second polarizing plate 221) of second display panel 200, third bonding layer 253 is bonded onto second bonding layer 252, and first bonding layer 251 is bonded onto third bonding layer 253.

Then, as illustrated in part (c) of FIG. 5, first display panel 100 is bonded onto bonding member 250. Then, as illustrated in part (d) of FIG. 5, first display panel 100 and second display panel 200 are pressed against each other and bonded together by bonding member 250.

At this point, in bonding member 250, first bonding layer 251 bonded to first polarizing plate 120 of first display panel 100 and second bonding layer 252 bonded to the second polarizing plate 220 of second display panel 200 are made of a hard material. Consequently, the bubble can be prevented from invading into the interface between first display panel 100 or second display panel 200 and bonding member 250.

Because soft third bonding layer 253 is used as a part of bonding member 250, even if first bonding layer 251 and second bonding layer 252 are made of a hard material, the minute irregularities of first polarizing plate 120 and second polarizing plate 220 can be absorbed by third bonding layer 253 when first display panel 100 and second display panel 200 are pressed against each other with bonding member 250 interposed therebetween. That is, stress from the minute irregularities of first polarizing plate 120 and second polarizing plate 220 due to the pressing of first display panel 100 and second display panel 200 can be absorbed by deformation of soft, flexible third bonding layer 253.

Consequently, first TFT substrate 111 of first liquid crystal cell 110 can be prevented from being distorted due to the minute irregularities of first polarizing plate 120, or second counter substrate 212 of second liquid crystal cell 210 can be prevented from being distorted due to the minute irregularities of second polarizing plate 220, so that the thickness unevenness can be prevented in first liquid crystal cell 110 and second liquid crystal cell 210.

When bonding soft third bonding layer 253 onto second bonding layer 252, there is a risk that the bubble invades between second bonding layer 252 and third bonding layer 253. However, hard first bonding layer 251 is bonded onto third bonding layer 253, so that the bubble that invades between second bonding layer 252 and third bonding layer 253 can be removed.

In the first exemplary embodiment, when bonding member 250 is bonded to second display panel 200, first bonding layer 251, second bonding layer 252, and third bonding layer 253 are sequentially bonded one by one onto second display panel 200. However, the present disclosure is not limited to the first exemplary embodiment. For example, first bonding layer 251, second bonding layer 252, and third bonding layer 253 may previously be bonded together to form one integrated bonding member 250, and bonding member 250 may be bonded to second display panel 200. In this case, hard first bonding layer 251 and second bonding layer 252 are also present in bonding member 250, so that the bubble can be prevented from invading between first display panel 100 or second display panel 200 and bonding member 250 when first display panel 100 and second display panel 200 are bonded to each other by bonding member 250. Soft third bonding layer 253 is present in bonding member 250, so that the minute irregularities of first polarizing plate 120 and second polarizing plate 220 can be absorbed by third bonding layer 253 when first display panel 100 and second display panel 200 are pressed against each other with bonding member 250 interposed therebetween.

As described above, bonding member 250 bonding first display panel 100 and second display panel 200 together is configured such that third bonding layer 253 made of the soft material is sandwiched between first bonding layer 251 and second bonding layer 252, which are made of the hard material, so that the generation of the thickness unevenness in first liquid crystal cell 110 and second liquid crystal cell 210 or the invasion of the bubble into the interface between the two members between first display panel 100 and second display panel 200 can be prevented. Thus, the degradation of the quality of the display image can be prevented.

For example, a film thickness of bonding member 250 may be greater than or equal to 300 µm. Consequently, the minute irregularities of first polarizing plate 120 and second polarizing plate 220 can effectively be absorbed by bonding member 250, so that the thickness unevenness can effectively be prevented in first liquid crystal cell 110 and second liquid crystal cell 210.

As described above, in liquid crystal display device 1 of the first exemplary embodiment, the degradation of the quality of the display image can be prevented.

In the first exemplary embodiment, the three bonding layers (first bonding layer 251, second bonding layer 252, and third bonding layer 253) in bonding member 250 have the same thickness, but the bonding layers may have different thicknesses.

Figure 6:
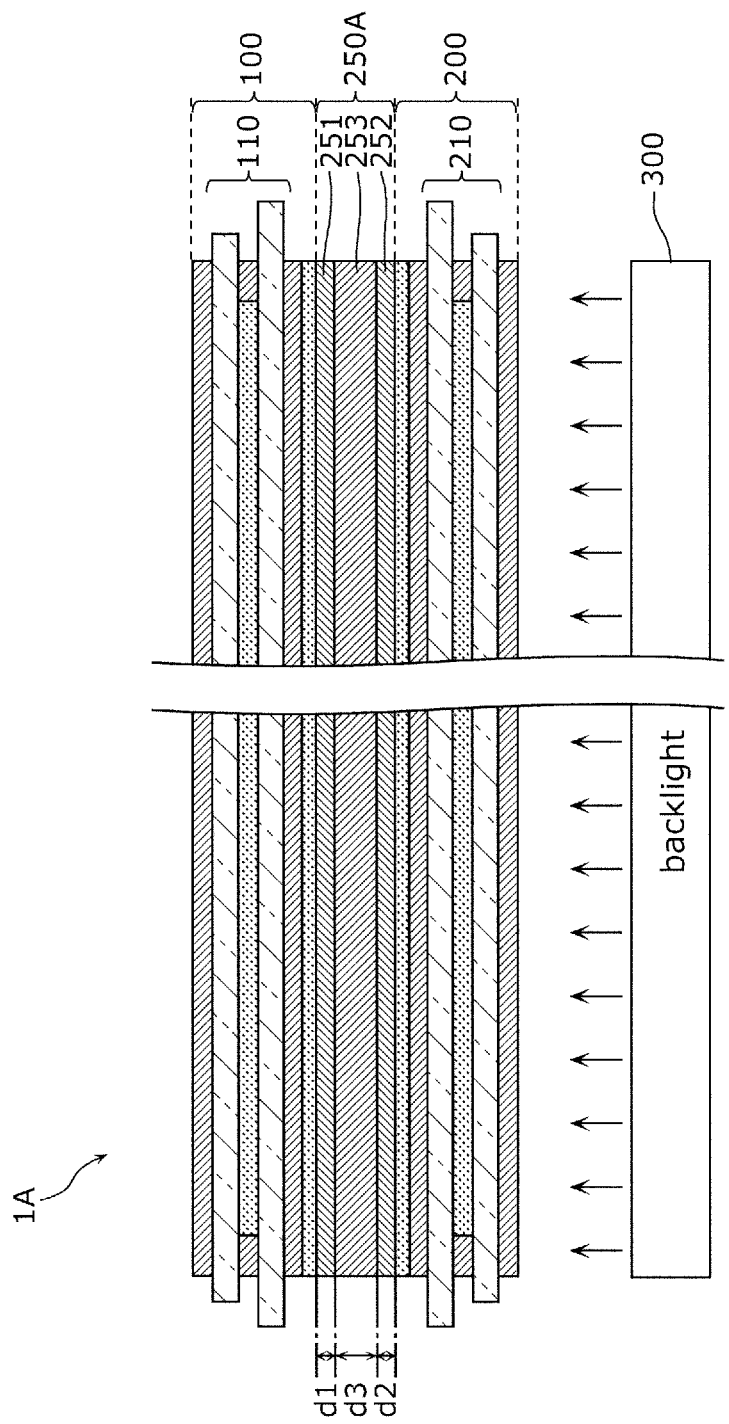
FIG. 6 is a sectional view illustrating a configuration of a liquid crystal display device according to a first modification of the first exemplary embodiment.

In this case, third bonding layer 253 having the flexibility is preferably thicker than first bonding layer 251 and second bonding layer 252. For example, as in liquid crystal display device 1A according to a first modification of the first exemplary embodiment in FIG. 6, in bonding member 250A, assuming that d1 is the thickness of first bonding layer 251, that d2 is the thickness of second bonding layer 252, and that d3 is the thickness of third bonding layer 253, d3>d1 and d3>d2 are preferably set.

In this case, a total film thickness of bonding member 250A of the first modification (FIG. 6) is the same as the total film thickness of bonding member 250 in the first exemplary embodiment, but third bonding layer 253 that is the intermediate layer in bonding member 250A of the first modification is thicker than that in bonding member 250 of the first exemplary embodiment. In the first modification, the film thickness of third bonding layer 253 is increased while the total film thickness of bonding member 250A is maintained.

In this way, as compared with liquid crystal display device 1 of the first exemplary embodiment, the minute irregularities on the surfaces of first polarizing plate 120 and second polarizing plate 220 are absorbed more easily by thickening soft third bonding layer 253. Consequently, the thickness unevenness can further be prevented in first liquid crystal cell 110 and second liquid crystal cell 210. Additionally, by thickening third bonding layer 253 without increasing the total film thickness of bonding member 250A, the thickness unevenness of first liquid crystal cell 110 and liquid crystal cell 210 can be prevented without wastefully thickening bonding member 250A. This allows the construction of low-profile, high-image quality liquid crystal display device 1A.

In the first exemplary embodiment, bonding member 250 has the laminated structure of three bonding layers (first bonding layer 251, second bonding layer 252, and third bonding layer 253), and first bonding layer 251, second bonding layer 252, and third bonding layer 253 have the same length (width).

In this case, the end of first bonding layer 251, the end of second bonding layer 252, and the end of third bonding layer 253 may be offset (shifted) from one another at the end of bonding member 250. At this point, in sequentially bonding first bonding layer 251, second bonding layer 252, and third bonding layer 253, the end of first bonding layer 251, the end of second bonding layer 252, and the end of third bonding layer 253 may be offset intentionally from one another, or the end of first bonding layer 251, the end of second bonding layer 252, and the end of third bonding layer 253 may be offset from one another by unintentionally-generated bonding deviation.

Figure 7:
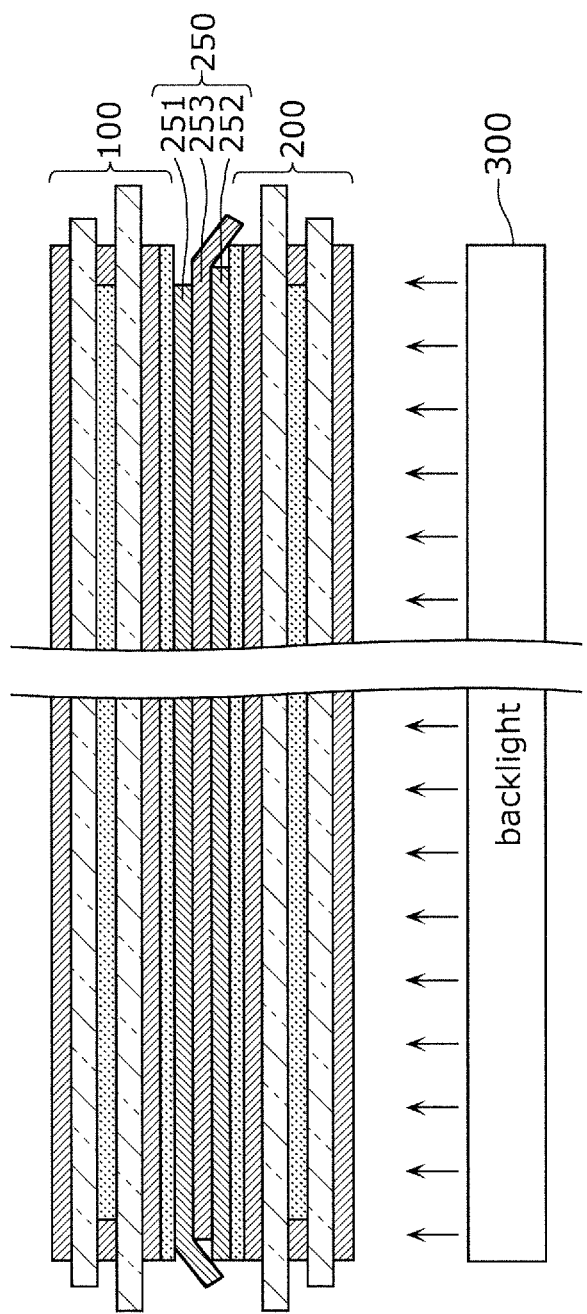
FIG. 7 is a view illustrating a state in which one bonding layer is misaligned.

However, the end of first bonding layer 251, the end of second bonding layer 252, and the end of third bonding layer 253 are offset excessively, the end of one of first bonding layer 251, second bonding layer 252, and third bonding layer 253 protrudes from other ends, and a part of the ends of first bonding layer 251, second bonding layer 252, and third bonding layer 253 covers other ends as illustrated in FIG. 7. In this case, there is a risk that the bubble is caught at the end of bonding member 250.

Figure 8:
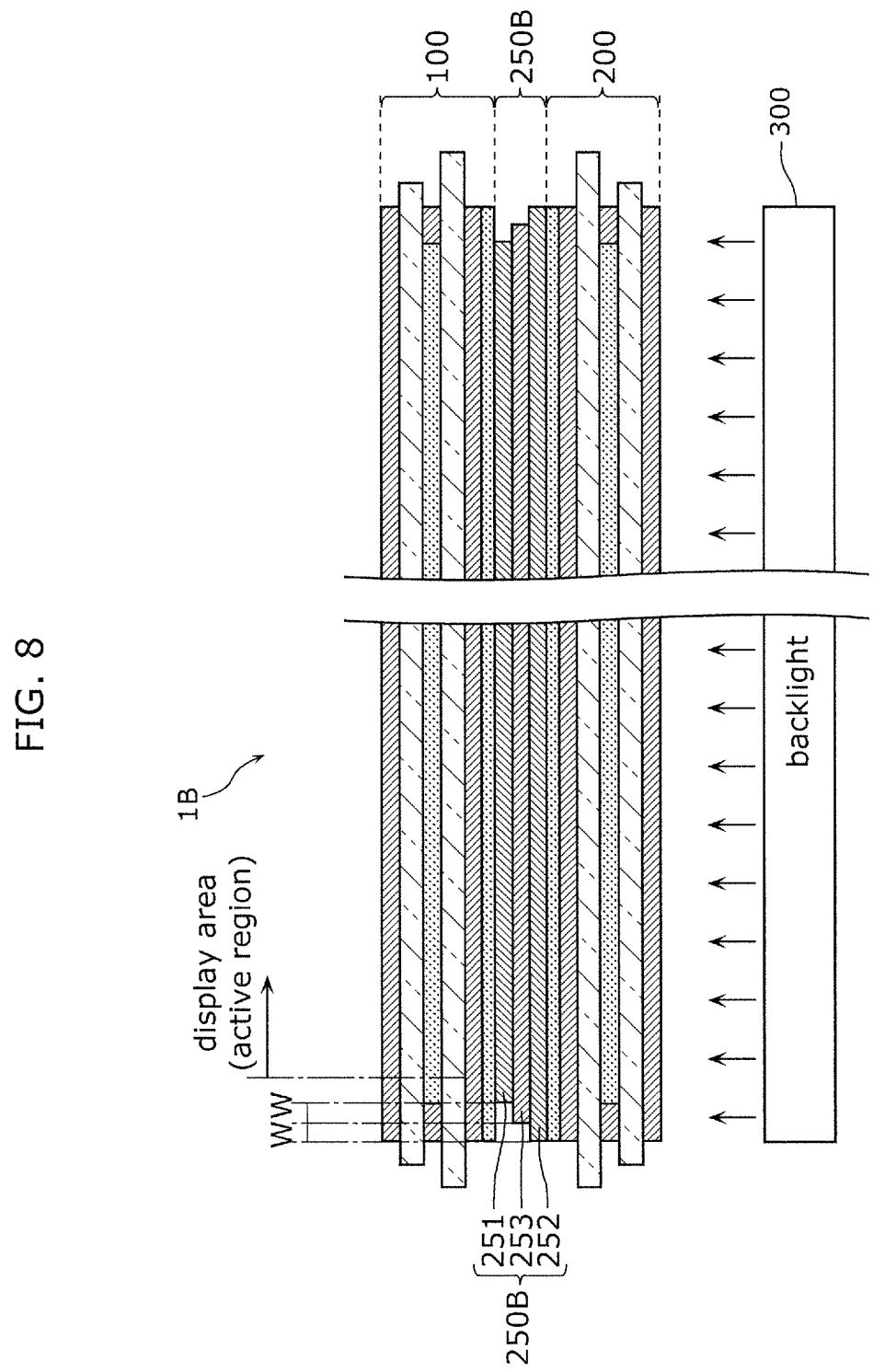
FIG. 8 is a sectional view illustrating a configuration of a liquid crystal display device according to a second modification of the first exemplary embodiment.

As in liquid crystal display device 1B in FIG. 8, the end of first bonding layer 251, the end of third bonding layer 253, and the end of second bonding layer 252 are preferably offset from one another in a stepwise manner at the end of bonding member 250B.

Specifically, in FIG. 8, the end of bonding member 250B is be formed stepwise by sequentially decreasing the length (width) of second bonding layer 252, the length (width) of third bonding layer 253, and the length (width) of first bonding layer 251 from second display panel 200 toward first display panel 100.

Consequently, the ends of first bonding layer 251, second bonding layer 252, and third bonding layer 253 can be prevented from protruding when second bonding layer 252, third bonding layer 253 and first bonding layer 251 are sequentially bonded. Thus, the bubble is prevented from being caught at the end of bonding member 250, so that the degradation of the quality of the display image can be prevented.

At the end of bonding member 250B in FIG. 8, shift amount W (a step portion of the stairs) of each step of first bonding layer 251, second bonding layer 252 and third bonding layer 253 ranges from 200 μm to 400 μm. In other words, the shift amount between the end of first bonding layer 251 and the end of third bonding layer 253 and the shift amount between the end of third bonding layer 253 and the end of second bonding layer 252 preferably range from 200 μm to 400 μm.

One bonding layer such as OCA has bonding accuracy of about 100 μm. Thus, by setting shift amount W of each step of first bonding layer 251, second bonding layer 252, and third bonding layer 253 to 200 μm to 400 μm, a part of the ends of first bonding layer 251, second bonding layer 252, and third bonding layer 253 does not cover other ends even if the bonding deviation is generated. This enables the bubble to be prevented from being caught at the end of bonding member 250.

The stepped portion at the end of bonding member 250B is preferably located outside the image display regions (active regions) of first display panel 100 and second display panel 200. Specifically, the stepped portion at the end of bonding member 250B is preferably formed at a position overlapping the frame region of the black matrix which is the boundary of the image display regions of first display panel 100 and second display panel 200. In this case, the stepped portion at the end of bonding member 250B can be formed at a position overlapping with a middle frame holding first display panel 100 and second display panel 200.

In this way, by locating the stepped portion at the end of bonding member 250B outside the image display regions (active regions) of first display panel 100 and second display panel 200, the degradation of the quality of the display image can be suppressed even if an external matter such as dust adheres to the stepped portion at the end of bonding member 250B.

A shape of the end of bonding member 250B is preferably formed according to a shape of stairs. For example, in the case that the bonding layer such as the OCA is individually punched from a large-size sheet using a punching blade, the adhesive resin dropping to the end face of the bonding layer is removed in pulling out the punching blade, or the end face of the bonding layer is formed into a flat surface, so that the end face of the punched bonding layer is preferably subjected to cutting. Alternatively, instead of the use of the punching blade, the bonding layer may be punched from the large-size sheet by laser cutting, whereby the end face of the bonding layer may be formed in the flat surface.

In FIG. 8, the end of bonding member 250B is formed stepwise by sequentially decreasing the length (width) of second bonding layer 252, the length (width) of third bonding layer 253, and the length (width) of first bonding layer 251 from second display panel 200 toward first display panel 100. However, the present disclosure is not limited thereto. For example, the end of bonding member 250B may be formed stepwise by sequentially decreasing a length (width) of first bonding layer 251, a length (width) of third bonding layer 253, and a length (width) of second bonding layer 252 from first display panel 100 toward second display panel 200.

Second Exemplary Embodiment

Figure 9:
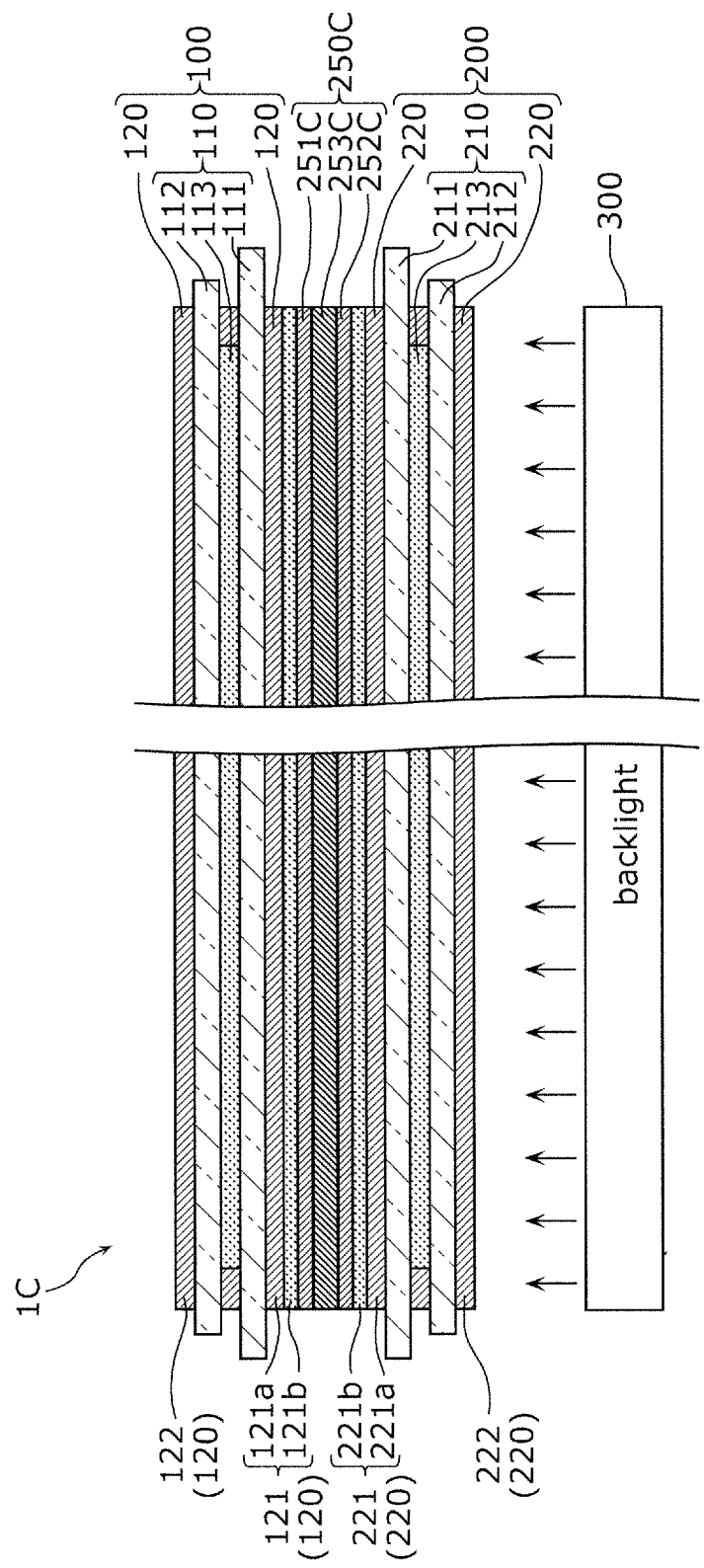
FIG. 9 is a sectional view illustrating a configuration of a liquid crystal display device of a second exemplary embodiment.

Liquid crystal display device 1C according to a second exemplary embodiment will be described below with reference to FIG. 9. FIG. 9 is a sectional view illustrating a configuration of liquid crystal display device 1C of the second exemplary embodiment.

As illustrated in FIG. 9, liquid crystal display device 1C of the second exemplary embodiment includes three-layer-structure bonding member 250C that bonds first display panel 100 and second display panel 200 together similarly to liquid crystal display device 1 of the first exemplary embodiment.

Specifically, bonding member 250C of the second exemplary embodiment includes first bonding layer 251C bonded to first polarizing plate 120 of first display panel 100, second bonding layer 252C bonded to second polarizing plate 220 of second display panel 200, and intermediate layer (third layer) 253C located between first bonding layer 251C and second bonding layer 252C.

Liquid crystal display device 1C of the second exemplary embodiment differs from liquid crystal display device 1 of the first exemplary embodiment in magnitude of hardness of the three bonding layers constituting the bonding member. Specifically, in bonding member 250 of the first exemplary embodiment, first bonding layer 251 and second bonding layer 252 are harder than intermediate layer 253. On the other hand, in bonding member 250C of the second exemplary embodiment, first bonding layer 251C and second bonding layer 252C are softer than intermediate layer 253C. That is, in bonding member 250C of the second exemplary embodiment, intermediate layer 253C is harder than first bonding layer 251C and second bonding layer 252C.

In bonding member 250C of the second exemplary embodiment, each of first bonding layer 251C, second bonding layer 252C, and intermediate layer 253C is a bonding sheet constructed with the film-shaped OCA. For example, third bonding layer 253 of bonding member 250 of the first exemplary embodiment can be used as first bonding layer 251C and second bonding layer 252C, which are the soft OCA. First bonding layer 251 or second bonding layer 252 of bonding member 250 of the first exemplary embodiment can be used as intermediate layer 253C which is the hard OCA. In this case, intermediate layer 253C constitutes the third bonding layer. Intermediate layer 253C is preferably thicker than first bonding layer 251C and second bonding layer 252C, but the present disclosure is not limited thereto.

The bubble can be prevented from invading into the interface between the two members between first display panel 100 and second display panel 200 by bonding first display panel 100 and second display panel 200 using bonding member 250C in which intermediate layer 253C is harder than first bonding layer 251C and second bonding layer 252C.

For example, in the case that first bonding layer 251C, second bonding layer 252C, and intermediate layer 253C are sequentially bonded one by one as in the first exemplary embodiment, even if the bubble invades between second display panel 200 and second bonding layer 252C in initially bonding soft second bonding layer 252C onto second display panel 200, hard intermediate layer 253C is next bonded onto second bonding layer 252C, so that the bubble invading between second display panel 200 and second bonding layer 252C can be removed. Then, even if the bubble invades between intermediate layer 253C and first bonding layer 251C in bonding first bonding layer 251C onto intermediate layer 253C, hard first display panel 100 is next bonded onto first bonding layer 251C, so that the bubble invading between intermediate layer 253C and first bonding layer 251C can be removed.

In bonding bonding member 250C to second display panel 200, first bonding layer 251, second bonding layer 252, and intermediate layer 253C are not sequentially bonded one by one, but first display panel 100 and second display panel 200 may be bonded together using one bonding member 250C in which first bonding layer 251C, second bonding layer 252C, and intermediate layer 253C are previously integrated. In this case, hard intermediate layer 250C is also present in bonding member 250C, so that the bubble can be prevented from invading between first display panel 100 or second display panel 200 and bonding member 250C in bonding first display panel 100 and second display panel 200 together by bonding member 250C.

Additionally, in the second exemplary embodiment, soft first bonding layer 251C and second bonding layer 252C are also present in bonding member 250C, the minute irregularities of first polarizing plate 120 and second polarizing plate 220 can be absorbed by intermediate layer 253C similarly to the first exemplary embodiment. Consequently, the generation of the thickness unevenness due to the minute irregularities of first polarizing plate 120 and second polarizing plate 220 can be prevented in first liquid crystal cell 110 and second liquid crystal cell 210.

As described above, in liquid crystal display device 1C of the second exemplary embodiment, bonding member 250C bonding first display panel 100 and second display panel 200 together has the structure in which hard intermediate layer 253C is sandwiched between first bonding layer 251C and second bonding layer 252C. Consequently, the bubble can be prevented from invading into the interface between the two members between first display panel 100 and second display panel 200, and the thickness unevenness can be prevented in first liquid crystal cell 110 and second liquid crystal cell 210. Thus, the degradation of the quality of the display image can be prevented.

Although intermediate layer 253C of the second exemplary embodiment is made of resin, intermediate layer 253C is preferably made of glass which is harder than the resin. In this case, a glass plate can be used as intermediate layer 253C.

Consequently, the bubble can be prevented from remaining at the interface between the two members between first display panel 100 and second display panel 200.

In bonding member 250C of liquid crystal display device 1C in FIG. 9, first bonding layer 251C, second bonding layer 252C, and intermediate layer 253C have the same length (width), and the ends of first bonding layers 251C, second bonding layer 252C, and intermediate layer 253C are flush with one another. However, the present disclosure is not limited thereto.

For example, the end of first bonding layer 251C, the end of second bonding layer 252C, and the end of intermediate layer 253C may be offset from one another at the end of bonding member 250C. Specifically, the end of bonding member 250C may be formed stepwise by sequentially decreasing or increasing the length (width) of second bonding layer 252C, the length (width) of intermediate layer 253C, and the length (width) of first bonding layer 251C.

Consequently, the ends of first bonding layer 251C, second bonding layer 252C, and intermediate layer 253C can be prevented from protruding when second bonding layer 252C, intermediate layer 253C and first bonding layer 251C are sequentially bonded. Thus, the bubble is prevented from being caught at the end of bonding member 250C, so that the degradation of the quality of the display image can be prevented.

Figure 10:
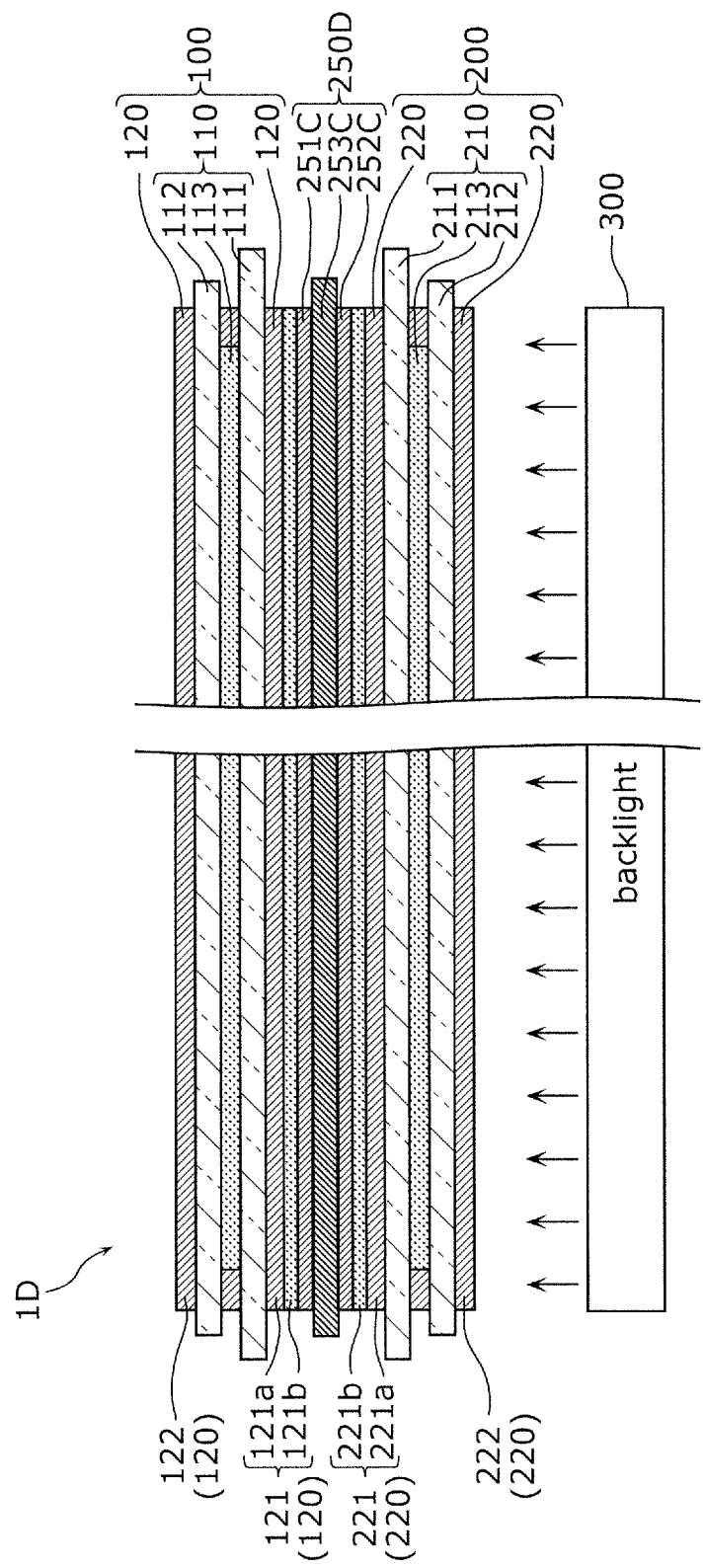
FIG. 10 is a sectional view illustrating a configuration of a liquid crystal display device according to a modification of the second exemplary embodiment.

As in liquid crystal display device 1D in FIG. 10, the end of hard intermediate layer 253C may project from the ends of soft first bonding layer 251C and second bonding layer 252C at the end of bonding member 250D. For example, intermediate layer 253C may be longer than first bonding layer 251C and second bonding layer 252C.

With this configuration, even in the case that first bonding layer 251C, second bonding layer 252C, and intermediate layer 253C are sequentially bonded one by one, or even in the case that bonding members 250C in which first bonding layer 251C, second bonding layer 252C, and intermediate layer 253C are integrated is bonded, the ends of the soft bonding layers (first bonding layer 251C and second bonding layer 252C) do not protrude and drop from the end of the other bonding layers, so that the bubble can be prevented from being caught at the dropping end portion of the bonding layer.

In FIG. 10, the end of intermediate layer 253C projects from the end of first bonding layer 251C and the end of second bonding layer 252C in the entire periphery of bonding member 250C. However, the present disclosure is not limited thereto. For example, for bonding member 250C having the rectangular shape in planar view, the end of intermediate layer 253C preferably projects from the end of first bonding layer 251C and the end of second bonding layer 252C at one side, two sides, or three sides out of four sides. In this case, at one side or two sides in the bonding direction, the end of intermediate layer 253C preferably projects from the end of first bonding layer 251C and the end of second bonding layer 252C.

Third Exemplary Embodiment

Figure 11:
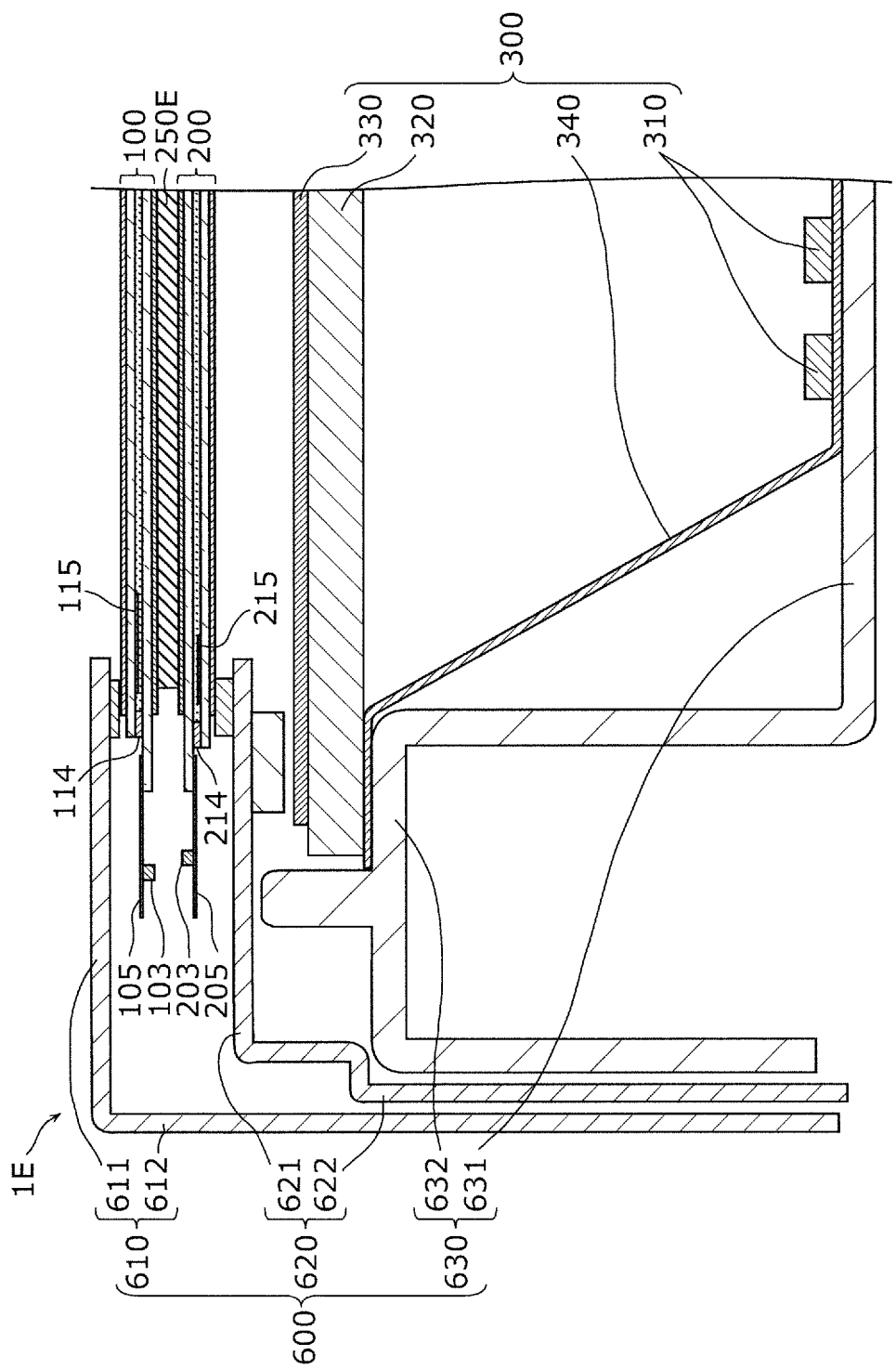
FIG. 11 is a partial sectional view illustrating a configuration of a liquid crystal display device of a third exemplary embodiment.
Figure 12:
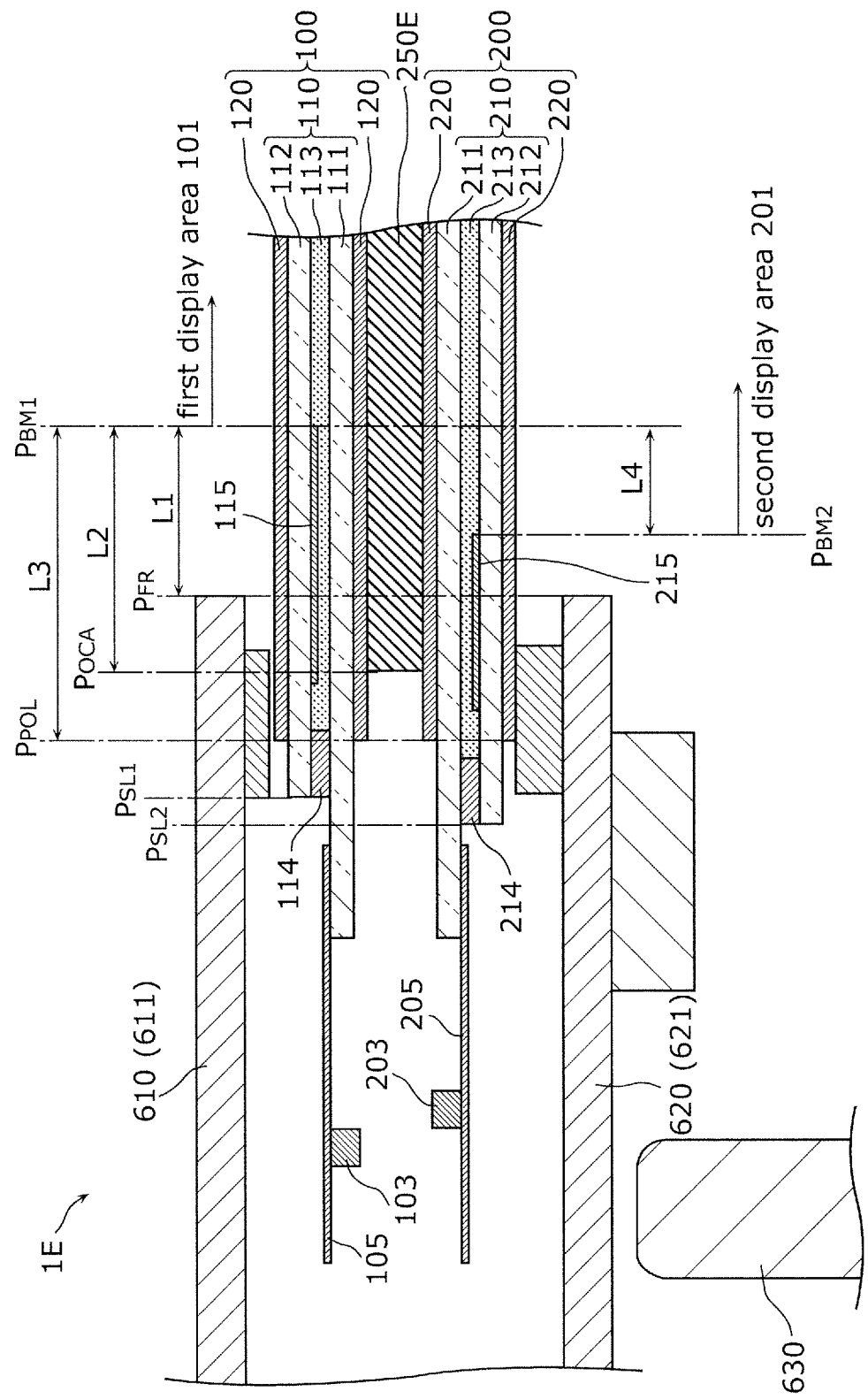
FIG. 12 is an enlarged sectional view illustrating a configuration of the liquid crystal display device of the third exemplary embodiment.

Liquid crystal display device 1E according to a third exemplary embodiment will be described below with reference to FIGS. 11 and 12. FIG. 11 is a partially sectional view of liquid crystal display device 1E of the third exemplary embodiment. FIG. 12 is an enlarged sectional view of FIG. 11. An end on the gate driver side where first gate FPC 105 and second gate FPC 205 are provided is illustrated in FIGS. 11 and 12.

As illustrated in FIGS. 11 and 12, liquid crystal display device 1E includes first display panel 100, second display panel 200, bonding member 250E bonding first display panel 100 and second display panel 200 together, backlight 300, and frame 600. The structures of backlight 300 and frame 600 of the third exemplary embodiment can also be applied to the first and second exemplary embodiments.

Frame 600 is a holding member that holds first display panel 100, second display panel 200, and backlight 300. In the third exemplary embodiment, frame 600 includes upper frame 610 (first frame), middle frame 620 (second frame), and lower frame 630 (third frame).

First display panel 100 and second display panel 200 have the same configuration as the first and second exemplary embodiments. Thus, first display panel 100 includes first TFT substrate 111, first liquid crystal cell 110 including first counter substrate 112 and first liquid crystal layer 113, and the pair of first polarizing plates 120 sandwiching first liquid crystal cell 110.

First liquid crystal layer 113 includes first sealing member 114 sealing first liquid crystal molecules between a pair of first substrates that are of first TFT substrate 111 and first counter substrate 112. For example, first sealing member 114 is formed into the frame shape along outer peripheral ends of first TFT substrate 111 and first counter substrate 112. For example, first sealing member 114 has the width of about 1 mm to about 2 mm, but the present disclosure is not limited thereto.

First liquid crystal cell 110 includes first peripheral light shielding layer 115 formed in a region around first image display region 101 (active region). First peripheral light shielding layer 115 is formed on first counter substrate 112. For example, first peripheral light shielding layer 115 can be made of a material similar to that of the black matrix formed in first image display region 101.

Second liquid crystal layer 213 includes second sealing member 214 sealing second liquid crystal molecules between a pair of second substrates that are of second TFT substrate 211 and second counter substrate 212. For example, second sealing member 214 is formed into the frame shape along outer peripheral ends of second TFT substrate 211 and second counter substrate 212. For example, second sealing member 214 has the same width as first sealing member 114 and the width ranges from about 1 mm to about 2 mm. However, but the present disclosure is not limited thereto.

In the third exemplary embodiment, second sealing member 214 is formed outside first sealing member 114 of first liquid crystal cell 110. Specifically, the outside end of second sealing member 214 is located outside the outside end of first sealing member 114, and the inside end of second sealing member 214 is located outside the inside end of first sealing member 114.

Second liquid crystal cell 210 includes second peripheral light shielding layer 215 formed in a region around second image display region 201 (active region). Second peripheral light shielding layer 215 is formed on second counter substrate 212. For example, second peripheral light shielding layer 215 can be made of a material similar to that of the black matrix formed in second image display region 201.

In the third exemplary embodiment, second peripheral light shielding layer 215 is formed outside first peripheral light shielding layer 115 of first liquid crystal cell 110. Specifically, the outside end of second peripheral light shielding layer 215 is located outside the outside end of first peripheral light shielding layer 115, and the inside end of second peripheral light shielding layer 215 is located outside the inside end of first peripheral light shielding layer 115. In this way, the inside end of second peripheral light shielding layer 215 is located outside the inside end of first peripheral light shielding layer 115, whereby the image quality at the end of the display image can be prevented from being poorly seen when the display screen of liquid crystal display device 1E is obliquely viewed.

Backlight 300 includes a plurality of LEDs 310, transparent substrate 320, optical sheet 330, and reflecting plate 340.

Each of the plurality of LEDs 310 is an example of the light emitting element. For example, a white LED light source emitting white light can be used as LED 310. In the third exemplary embodiment, backlight 300 is a direct-under type backlight, and the plurality of LEDs 310 are two-dimensionally arranged. Specifically, the plurality of LEDs 310 are arranged into a matrix form at a bottom of main body 631 of lower frame 630. In the third exemplary embodiment, the plurality of LEDs 310 are disposed on the bottom of reflecting plate 340 disposed in a recess of lower frame 630.

Transparent substrate 320 and optical sheet 330 are disposed in front of LED 310 (light emitting side). That is, transparent substrate 320 and optical sheet 330 are opposite to main body 631 of lower frame 630.

For example, transparent substrate 320 is a glass plate transparent to visible light. In this case, tempered glass having excellent mechanical strength is preferably used as transparent substrate 320. Thus, transparent substrate 320 having small thermal expansion or contraction and high rigidity can be constructed using the glass plate as transparent substrate 320.

The outer peripheral end portion of transparent substrate 320 is supported by support 632 of lower frame 630. Specifically, the outer peripheral end of transparent substrate 320 is placed on a flange of reflecting plate 340 placed on support 632.

Optical sheet 330 is disposed in front (light emitting side) of LED 310. In the third exemplary embodiment, optical sheet 330 is bonded to the front surface of transparent substrate 320. Optical sheet 330 provides optical action to the light emitted from LED 310. For example, a diffusion plate (diffusion sheet) and/or a prism sheet that diffuses the light emitted from LED 310 can be used as optical sheet 330.

For example, optical sheet 330 is a resin sheet made of a resin material. The number of optical sheets 330 may be one or plural.

Reflecting plate 340 has a function of reflecting the light of the plurality of LEDs 310. Reflecting plate 340 is disposed at the bottom of main body 631 of lower frame 630. Reflecting plate 340 is made of a thin metal plate such as a steel plate and an aluminum plate. In this case, the surface of reflecting plate 340 may be subjected to white painting. Reflecting plate 340 may be made of a white resin material.

As described above, frame 600 includes upper frame 610, middle frame 620, and lower frame 630. For example, upper frame 610, middle frame 620, and lower frame 630 are fixed to one another by screws.

Upper frame 610 that is of the first frame is a front frame disposed on an upper side in frame 600. In the third exemplary embodiment, upper frame 610 is a metal frame having a rectangular frame shape in planar view and an L-shape in section, and is made of a metal material, such as a steel plate and an aluminum plate, which has high rigidity. By way of example, upper frame 610 can be formed by performing press working such as bending on a metal plate cut into a predetermined shape.

Upper frame 610 includes first bezel 611 covering a peripheral portion of first display panel 100 and first sidewall 612 extending from first bezel 611 to the side of lower frame 630. First bezel 611 projects into a flange shape from the upper end of first sidewall 612, and is formed into a frame shape so as to cover the entire periphery at the outer peripheral end of the surface of first display panel 100.

Middle frame 620 that is of the second frame is disposed between upper frame 610 and lower frame 630. Middle frame 620 supports first display panel 100 and second display panel 200 from the side of backlight 300. In the third exemplary embodiment, middle frame 620 is a metal frame having a rectangular frame shape in planar view and an L-shape in section, and is made of a metal material, such as a steel plate and an aluminum plate, which has high rigidity. By way of example, middle frame 620 can be formed by performing press working such as bending on a metal plate cut into a predetermined shape.

Middle frame 620 includes second bezel 621 covering the peripheral portion of second display panel 200 and a second sidewall 622 extending from second bezel 621 to the side of lower frame 630. Second bezel 621 protrudes in the flange shape from the upper end of second sidewall 622, and is formed in the frame shape so as to cover the entire periphery at the outer peripheral end of a rear surface of second display panel 200.

Lower frame 630 that is of the third frame is a rear frame disposed on the back side in frame 600. In the third exemplary embodiment, lower frame 630 is a metal casing formed into a recessed shape as a whole, and is made of a metal material, such as a steel plate and an aluminum plate, which has high rigidity.

Lower frame 630 includes main body 631 that accommodates LED 310 of backlight 300 therein and support 632 that supports transparent substrate 320 and reflecting plate 340 of backlight 300.

In the liquid crystal display device 1E configured as described above, although first display panel 100 and second display panel 200 are bonded together by bonding member 250E similarly to the liquid crystal display device 1 of the first exemplary embodiment, bonding member 250E of the third exemplary embodiment has a single-layer structure that may be constructed with only one OCA unlike bonding member 250 of the first exemplary embodiment.

In the third exemplary embodiment, bonding member 250E is made of a soft material. For example, bonding member 250E is as soft as third bonding layer 253 of bonding member 250 of the first exemplary embodiment. For example, bonding member 250E is made of an acrylic resin material.

For example, bonding member 250E has a thickness of 300 μm or more.

As described above, bonding member 250E is constructed with the thick, soft OCA, so that the minute irregularities of first polarizing plate 120 and second polarizing plate 220 can be absorbed by bonding member 250E similarly to the first exemplary embodiment. Consequently, the generation of the thickness unevenness due to the minute irregularities of first polarizing plate 120 and second polarizing plate 220 can be prevented in first liquid crystal cell 110 and second liquid crystal cell 210.

On the other hand, because bonding member 250E is constructed only with the soft OCA, there is a risk that the bubble invades between first display panel 100 and bonding member 250E or between second display panel 200 and bonding member 250E at the end of bonding member 250E when first display panel 100 and second display panel 200 are bonded together by bonding member 250E. For example, when the end of bonding member 250E protrudes from the end of first polarizing plate 120 of first display panel 100 and the end of second polarizing plate 220 of second display panel 200, the end of bonding member 250E drops to the side of first polarizing plate 120 side or the side of second polarizing plate 220, and there is a risk that the bubble invades between first polarizing plate 120 or second polarizing plate 220 and bonding member 250E. As a result, there is a risk that the bubble invades in the active region to degrade the quality of the display image.

Additionally, when the end of bonding member 250E drops, there is a risk that a component (such as acrylic acid) of the adhesive layer at the end of bonding member 250E invades into the interface between first polarizing plate 120 and first liquid crystal cell 110 or the interface between second polarizing plate 220 and second liquid crystal cell 210 to degrade first polarizing plate 120 or second polarizing plate 220. As a result, there is a risk that the quality of the display image is degraded.

For this reason, in liquid crystal display device 1E of the third exemplary embodiment, the end (POCA) of bonding member 250E is located inside the end (PPOL) of first polarizing plate 120 and the end (PPOL) of second polarizing plate 220 at any end of first display panel 100 and second display panel 200. That is, the end of bonding member 250E is located closer to the active region (first image display region 101 and second image display region 201) than the end of first polarizing plate 120 and the end of second polarizing plate 220.

In this way, the end (POCA) of bonding member 250E is located inside the end (PPOL) of first polarizing plate 120 and the end (PPOL) of second polarizing plate 220, so that the bubble can be prevented from invading between first polarizing plate 120 or second polarizing plate 220 and bonding member 250E when first display panel 100 and second display panel 200 are bonded together by bonding member 250E.

When the end (POCA) of bonding member 250E is located inside the end (PPOL) of first polarizing plate 120 and the end (PPOL) of second polarizing plate 220, the end of bonding member 250E does not drop. Consequently, the component of the adhesive layer at the end of bonding member 250E can be prevented from invading into the interface between first polarizing plate 120 and first liquid crystal cell 110 or the interface between second polarizing plate 220 and second liquid crystal cell 210 to degrade first polarizing plate 120 or second polarizing plate 220.

As described above, in liquid crystal display device 1E of the third exemplary embodiment, the end (POCA) of bonding member 250E is located inside the end (PPOL) of first polarizing plate 120 and the end (PPOL) of second polarizing plate 220, so that the degradation of first polarizing plate 120 or second polarizing plate 220 due to the component of the adhesive layer of bonding member 250E or the invasion of the bubble into the peripheral portion of bonding member 250E can be prevented. As a result, the degradation of the quality of the display image can be prevented.

In the third exemplary embodiment, the end of bonding member 250E on the side of first gate FPC 105 is configured to be located inside the end of first polarizing plate 120 and the end of second polarizing plate 220. However, the present disclosure is not limited to thereto. For example, the end of bonding member 250E on the side of first source FPC 104 may be configured to be located inside the end of first polarizing plate 120 and the end of second polarizing plate 220, or both the end of bonding member 250E on the side of first gate FPC 105 and the end of bonding member 250E on the side of first source FPC 104 (that is, all the ends) may be configured to be located inside the end of first polarizing plate 120 and the end of second polarizing plate 220.

In the third exemplary embodiment, at the ends of first display panel 100 and second display panel 200, the end (POCA) of bonding member 250E is located outside the inside end (PBM 1) of first peripheral light shielding layer 115 of first liquid crystal cell 110 and the inside end (PBM 2) of second peripheral light shielding layer 215 of second liquid crystal cell 210.

With this configuration, the image quality at the end of the display image can be prevented from being poorly seen when the display screen of liquid crystal display device 1E is obliquely viewed.

In the third exemplary embodiment, at the ends of first display panel 100 and second display panel 200, the end (POCA) of bonding member 250E is located outside the inside end (PFR) of first bezel 611 of upper frame 610 and the inside end (PFR) of second bezel 621 of middle frame 620. That is, the end (POCA) of bonding member 250E is located outside the opening end of first bezel 611 of upper frame 610 and the opening end of second bezel 621 of middle frame 620.

With this configuration, the image quality at the end of the display image can further be prevented from being poorly seen when the display screen of liquid crystal display device 1E is obliquely viewed. For example, distance L1 from an inside end (PBM1) of first peripheral light shielding layer 115 of first liquid crystal cell 110 to an end (PFR) of upper frame 610 is 2.52 mm.

In the third exemplary embodiment, at the ends of first display panel 100 and second display panel 200, the end (POCA) of bonding member 250E is located inside the outside end (PSL1) of first sealing member 114 of first liquid crystal cell 110 and the outside end (PSL2) of second sealing member 214 of second liquid crystal cell 210.

With this configuration, bonding member 250E is prevented from becoming unnecessarily long, so that the bubble can be prevented from invading between first display panel 100 or second display panel 200 and bonding member 250E when first display panel 100 and second display panel 200 are bonded together by bonding member 250E. Consequently, the degradation of the quality of the display image can further be prevented.

The third exemplary embodiment may be applied to the first and second exemplary embodiments. That is, the third exemplary embodiment can also be applied to the case that bonding member 250E has a three-layer structure including three bonding layers. The end of a part of the three bonding layers may be offset (shifted) in the case that bonding member 250E has the three-layer structure.

Other Modifications

The liquid crystal display device of the present disclosure has been described above based on the first to third exemplary embodiments, but the present disclosure is not limited to the first to third exemplary embodiments.

For example, in the first and second exemplary embodiments, bonding members 250, 250A, 250B, 250C, 250D are constructed with the three bonding layers. However, the present disclosure is not limited to thereto, but bonding members 250, 250A, 250B, 250C, 250D may be constructed with at least four bonding layers.

In the first to third exemplary embodiments, when first display panel 100 and second display panel 200 are bonded together by the bonding member, the bonding member is bonded to second display panel 200, and then bonded to first display panel 100. However, the present disclosure is not limited to thereto. That is, the bonding member may be bonded to second display panel 200 after bonded to first display panel 100.

Those skilled in the art will readily appreciate that many modifications are possible in the above exemplary embodiment and variations without materially departing from the novel teachings and advantages of the present disclosure. Accordingly, all such modifications are intended to be included within the scope of the present disclosure.

What is claimed is:

1. A liquid crystal display device comprising:
   a first display panel including a first liquid crystal cell and a pair of first polarizing plates sandwiching the first liquid crystal cell;
   a second display panel including a second liquid crystal cell and a pair of second polarizing plates sandwiching the second liquid crystal cell;
   a bonding member located between the first display panel and the second display panel and bonding one of the pair of first polarizing plates of the first display panel and one of the pair of second polarizing plates of the second display panel together;
   a first frame including a first bezel covering a peripheral portion of the first display panel; and
   a second frame including a second bezel covering a peripheral portion of the second display panel,
   wherein the first display panel, the bonding member, and the second display panel are between the first bezel and the second bezel, and
   an end of the bonding member is located inside an end of the first polarizing plate and an end of the second polarizing plate, and the end of the bonding member is located outside an inside end of the first bezel and an inside end of the second bezel.

2. The liquid crystal display device according to claim 1, wherein
   the first liquid crystal cell includes a first peripheral light shielding layer formed in a region around a first image display region, the second liquid crystal cell includes a second peripheral light shielding layer formed in a region around the second image display region, and the end of the bonding member is located outside an inside end of the first peripheral light shielding layer and an inside end of the second peripheral light shielding layer.

3. The liquid crystal display device according to claim 1, wherein the first liquid crystal cell includes a pair of first substrates and a first sealing member sealing a first liquid crystal layer between the pair of first substrates, the second liquid crystal cell includes a pair of second substrates and a second sealing member sealing a second liquid crystal layer between the pair of second substrates, and the end of the bonding member is located inside an outside end of the first sealing member and an outside end of the second sealing member.

4. The liquid crystal display device according to claim 1, wherein the bonding member includes a first bonding layer bonded to the first polarizing plate and a second bonding layer bonded to the second polarizing plate, and an end of the first bonding layer and an end of the second bonding layer are offset from each other at an end of the bonding member.

5. The liquid crystal display device according to claim 4, wherein the bonding member further includes a third bonding layer located between the first bonding layer and the second bonding layer, and an end of the first bonding layer, an end of the third bonding layer, and an end of the second bonding layer are sequentially located inside or outside in this order.

6. The liquid crystal display device according to claim 1, wherein the bonding member includes a first bonding layer bonded to the first polarizing plate, a second bonding layer bonded to the second polarizing plate, and a third bonding layer located between the first bonding layer and the second bonding layer, and the first bonding layer and the second bonding layer are harder than the third bonding layer.

7. The liquid crystal display device according to claim 1, wherein the bonding member includes a first bonding layer bonded to the first polarizing plate, a second bonding layer bonded to the second polarizing plate, and a third bonding layer located between the first bonding layer and the second bonding layer, and the third bonding layer is harder than the first bonding layer and the second bonding layer.

8. The liquid crystal display device according to claim 1, wherein the bonding member includes a first bonding layer bonded to the first polarizing plate, a second bonding layer bonded to the second polarizing plate, and a third bonding layer located between the first bonding layer and the second bonding layer, and the third bonding layer is thicker than the first bonding layer and the second bonding layer.

9. The liquid crystal display device according to claim 5, wherein a shift amount between the end of the first bonding layer and the end of the third bonding layer and a shift amount between the end of the third bonding layer and the end of the second bonding layer each range from 200 um to 400 um.

10. A liquid crystal display device comprising:

a first display panel including a first liquid crystal cell and a pair of first polarizing plates sandwiching the first liquid crystal cell;

a second display panel including a second liquid crystal cell and a pair of second polarizing plates sandwiching the second liquid crystal cell; and a bonding member located between the first display panel and the second display panel, and bonding one of the pair of first polarizing plates of the first display panel and one of the pair of second polarizing plates of the second display panel together, wherein the bonding member includes a first bonding layer bonded to the first polarizing plate, a second bonding layer bonded to the second polarizing plate, and a third bonding layer located between the first bonding layer and the second bonding layer, and one of:

an end of the first bonding layer, an end of the third bonding layer, and an end of the second bonding layer are sequentially located outside in this order, and the other end of the first bonding layer, the other end of the third bonding layer, and the other end of the second bonding layer are sequentially located outside in this order, or an end of the first bonding layer, an end of the third bonding layer, and an end of the second bonding layer are sequentially located inside in this order, and the other end of the first bonding layer, the other end of the third bonding layer, and the other end of the second bonding layer are sequentially located inside in this order.

11. The liquid crystal display device according to claim 10, wherein the first bonding layer and the second bonding layer are harder than the third bonding layer.

12. The liquid crystal display device according to claim 10, wherein the third bonding layer is harder than the first bonding layer and the second bonding layer.

13. The liquid crystal display device according to claim 10, wherein the third bonding layer is thicker than the first bonding layer and the second bonding layer.

14. The liquid crystal display device according to claim 10, wherein a shift amount between the end of the first bonding layer and the end of the third bonding layer and a shift amount between the end of the third bonding layer and the end of the second bonding layer each range from 200 um to 400 um.

* * * * *